(12) United States Patent
Pierce

(10) Patent No.: US 12,491,059 B2
(45) Date of Patent: *Dec. 9, 2025

(54) SUPPORT DEVICE FOR QUADRUPEDS

(71) Applicant: Upright Ideas LLC, Beaverton, OR (US)

(72) Inventor: Huma Qureshi Pierce, Portland, OR (US)

(73) Assignee: UpRight Ideas LLC, Beaverton, OR (US)

( * ) Notice: Subject to any disclaimer, the term of this patent is extended or adjusted under 35 U.S.C. 154(b) by 163 days.

This patent is subject to a terminal disclaimer.

(21) Appl. No.: 18/309,282

(22) Filed: Apr. 28, 2023

(65) Prior Publication Data

US 2023/0263611 A1    Aug. 24, 2023

Related U.S. Application Data

(63) Continuation-in-part of application No. 17/081,899, filed on Oct. 27, 2020, now Pat. No. 11,771,540.

(60) Provisional application No. 62/927,069, filed on Oct. 28, 2019.

(51) Int. Cl.
*A61D 9/00* (2006.01)
*A01K 13/00* (2006.01)

(52) U.S. Cl.
CPC ..................................... *A61D 9/00* (2013.01)

(58) Field of Classification Search
CPC .. A01K 27/002; A01K 13/006; A01K 13/005; A61D 9/00
See application file for complete search history.

(56) References Cited

U.S. PATENT DOCUMENTS

| | | | | |
|---|---|---|---|---|
| 1,437,255 | A * | 11/1922 | Mallinson | A01K 13/006 54/79.2 |
| 2,103,109 | A * | 12/1937 | De Mar | A01K 13/006 54/79.1 |
| 2,974,635 | A * | 3/1961 | Mcdowell | A01K 13/006 119/854 |
| 5,341,765 | A * | 8/1994 | McComb | A01K 13/007 54/79.2 |
| 5,887,772 | A * | 3/1999 | Dooley | A01K 27/008 119/858 |
| 6,267,083 | B1 * | 7/2001 | Chimienti | A01K 13/006 119/850 |

(Continued)

OTHER PUBLICATIONS

"ThunderShirt," ThunderShirt Website, Available Online at https://thundershirt.com/, Available as Early as Nov. 27, 2001, 4 pages.

(Continued)

*Primary Examiner* — Monica L Perry
(74) *Attorney, Agent, or Firm* — Lee & Hayes, P.C.

(57) ABSTRACT

A compression wrap garment integrally knit with variable or uniform compression areas for quadruped support and post-surgical support. The variable compression may be graded or independently distributed in a continuous or non-continuous manner. The compression wrap garments and embodiments can be used alone or in concert with a central vest, of a quadruped to provide support, rest, surface guarding, and tension to animals suffering from degenerative, surface, or deep spinal diseases including or excluding extremity trauma. The compression wrap garments may be of fixed or adjustable sizes.

16 Claims, 15 Drawing Sheets

(56) References Cited

U.S. PATENT DOCUMENTS

| | | | | |
|---|---|---|---|---|
| 7,793,619 | B2* | 9/2010 | Kajanoff | A01K 13/006 54/79.2 |
| 8,617,091 | B2* | 12/2013 | Brannon | A61D 9/00 602/19 |
| 8,733,296 | B1* | 5/2014 | Douglas | A01K 13/006 119/856 |
| 9,204,620 | B2* | 12/2015 | Hamilton | A01K 13/006 |
| 9,258,981 | B2* | 2/2016 | Bragion | A61D 9/00 |
| RE46,069 | E* | 7/2016 | GibsonHorn | A63B 21/4005 |
| D799,757 | S* | 10/2017 | Erwin | D30/145 |
| 10,881,082 | B2* | 1/2021 | Mills | A01K 13/006 |
| 2004/0244725 | A1* | 12/2004 | Hartman | A61D 9/00 119/856 |
| 2005/0034686 | A1* | 2/2005 | Spatt | A61D 9/00 119/816 |
| 2007/0056530 | A1* | 3/2007 | Nassour | A01K 13/006 119/850 |
| 2011/0209673 | A1* | 9/2011 | Weyerman | A61D 9/00 119/856 |
| 2013/0008393 | A1* | 1/2013 | Backman | A61D 9/00 119/850 |
| 2015/0156987 | A1* | 6/2015 | Baynes | A01K 13/006 119/850 |
| 2017/0086424 | A1* | 3/2017 | Blanchet | A01K 13/007 |
| 2017/0258040 | A1* | 9/2017 | Bang | A61D 3/00 |
| 2017/0290293 | A1* | 10/2017 | Spanovic | A01K 13/006 |
| 2018/0288970 | A1* | 10/2018 | Cunningham | B32B 5/245 |
| 2020/0344979 | A1* | 11/2020 | Spanovic | A01K 13/006 |
| 2020/0375147 | A1* | 12/2020 | Ohanian | A01K 27/002 |
| 2021/0121278 | A1* | 4/2021 | Pierce | A61D 9/00 |
| 2022/0000598 | A1* | 1/2022 | Thompson | A61D 9/00 |
| 2022/0117715 | A1* | 4/2022 | Mills | A61D 9/00 |

OTHER PUBLICATIONS

"Embrace Relief System | Hip, Back, & Shoulder Therapy," Animal Ortho Care Website, Available Online at https://www.aocpet.com/collections/all/products/embrace-relief-system?variant=18181600510048, Retrieved Oct. 13, 2020, 4 pages.

* cited by examiner

High Compression Zones
 Moderate Compression Zones
 Light Compression Zones

SUPPORT DEVICE FOR QUADRUPEDS

CROSS-REFERENCE TO RELATED APPLICATION

This application is a continuation-in-part of U.S. patent application Ser. No. 17/081,899 filed Oct. 27, 2020 and entitled "Support Device for Quadrupeds." U.S. patent application Ser. No. 17/081,899 claims benefit of U.S. Provisional Patent Application No. 62/927,069 filed Oct. 28, 2019 and entitled "Support Device for Quadrupeds." The entire contents of the above-referenced applications are incorporated herein by reference.

BACKGROUND

Spinal injury and degeneration are very common in quadrupeds (e.g., canines or equines) due to a variety of causes such as genetics, erratic activity, disease, or accident. Degeneration and injury can cause pain, stiffness, muscle atrophy, and decreased mobility. Current therapies, such as corticosteroid shots, non-steroidal anti-inflammatory drugs (NSAIDS), and/or surgical intervention have limited effectiveness. In addition, corticosteriod shots and NSAIDS are not intended for long term use.

Existing quadruped orthotic devices generally support the lower quarter of quadruped extremities. However, such devices do not provide adequate support for spinal injury and degeneration. Furthermore, many of the current quadruped orthotic devices are made of neoprene which can cause allergic reactions and overheating, exacerbating existing issues and increasing the discomfort of an animal.

Existing braces, such as stifle braces, can provide support on either side of the quadruped's stifle joint. However, they do not provide the necessary support for spinal damage. In general, they are used to immobilize the joint and limit its motion. Vests for medial shoulder instability can be designed for temporary use during rehabilitation to limit movement. However, they can also trigger allergic reactions. Wheeled devices can limit a quadruped's activity due to their bulk. There is therefore a need for methods and devices for providing hind and spinal support in quadrupeds suffering from spinal injury or degenerative disease.

BRIEF SUMMARY

Various embodiments of a device and therapeutic method for providing support to quadrupeds with spinal injury or degeneration are presented. The device may replicate the support provided by normal musculature, thereby alleviating pain and discomfort and encouraging healing. In some example embodiments, a therapeutic method for compensating for spinal strength insufficiency in a quadruped may include wearing a compression garment to support the hind legs of the quadruped while distributing the weight of the hind quarters across the body of the animal, avoiding the creation of localized stress or strain points. The device may be, in one example embodiment, a single length of material with two sleeves for the hind legs, holes for anterior (fore) legs and a central length that wraps around the torso of the animal. In another example, the device may be a single tube of material or a single length of material with two sleeves each of which fits over each hind leg, applying various amounts of compression, and wraps around the lower back of the animal, forward of the hind legs. In alternate embodiments, the compression garment may include a central vest and a separate single length of material with two sleeves or a single tube of material for the front or hind legs. These embodiments, alone or together, allow for compression to be applied to varying parts of the body as needed.

For example, in some embodiments, compression may be applied throughout the length of material. In other embodiments, compression may be applied only in the central region, when only the vest is worn, or only to the hind legs, when only the sleeve is worn. In other embodiments, the vest and the sleeve may be combined, and the same or different amounts of compression applied via the vest and/or the sleeve.

In some aspects, the central vest may have posterior holes through which the single long sleeve can be threaded and positioned, allowing for the sleeve to be coupled to the central vest. In such an embodiment, compression may be provided in the central region and the hind legs or just the hind legs, and the weaving of the sleeve through the holes of the central vest allows for correct positioning of the compression on the legs as well as appropriate distribution of body weight. The sleeve may freely move through the holes of the central vest or may be fastened to the top, underside, or inside of the central vest whether in conjunction with positioning through the holes of the central vest or separately. In other aspects, the vest and sleeve may be integrated into a single garment.

The vest, sleeve, tube, length of material, or single garment may provide uniform or variable compression. For example, based on the nature of the garment material and the needs of the quadruped, the compression applied may be uniformly light, medium, or high. In other aspects, the compression may be variable. In some aspects, the variable compression may be graded. In some aspects, sleeves of the compression garment generally apply substantially circumferential or annular compression to the leg of a quadruped. In some aspects, the longitudinally anterior and posterior halves of the sleeve (where the anterior half runs the length of the leg from the hip to the ankle and covers the patella) may have differing amounts of compression in all or in part. In other embodiments, the circumferential compression applied on the leg is uniform.

For example, in some embodiments, a compression garment for a quadruped may include a first moderate compression zone adapted for applying substantially circumferential compression to a hind metatarsus of the quadruped, a first light compression zone adapted for applying substantially circumferential compression from the hind metatarsus to a stifle joint, a first high compression zone adapted for applying compression at the back of the stifle joint and a second light compression zone over a patella, a third light compression zone adapted for applying substantially circumferential compression to a hind tibia and fibula, a fourth moderate compression zone adapted for applying substantially circumferential compression at a knee, and a fourth light compression zone adapted for applying substantially circumferential compression above the knee and adjacent to the fourth medium compression zone. Other arrangements of compression may also be used.

In embodiments with a sleeve and central vest, the sleeves and central vest may be made of the same or different materials with the same or different amounts of compression. In some aspects, the central vest may be made of non-compressive material and used to assist in placement and retention of the compressive material for the front or hind legs. In other embodiments, the vest may have various panels made of the same or different materials offering the same or variable levels of compression. For example, in some aspects, a band of the vest located over the belly may be made of a mesh with evenly spaced openings and may have no, constant, or variable compression. The size of the central vest may be customized, a standard size, and/or adjustable. For example, fastenings on a central portion of the vest along a longitudinal axis may allow for the length of the vest to be shortened relative to an unfastened state. Additionally, fastenings on the outer edges of the garment may allow the girth of the garment to be changed. Thus, the fit of the central vest may be adjusted along the length and/or the width of the vest.

The compression garment may use any type of material, new or recycled, that can be constructed to provide variable or uniform levels of compression. Compression may be varied within the garment, for example, by yarn type and size, characteristics of stretch yarns utilized, variable weft, warp, and fabric structure, such as stitch size. Along with different fiber blends, different fabric construction methods can be used such as weaving and knitting. The compression material can also be manufactured to have a range of elongation, modulus and breathability characteristics, depending on the fiber component composition used or chemical treatment to the fabric during finishing. In some embodiments, the compression material may be a spandex or elastane blend.

The compression may be exerted in a multi-planar fashion allowing for continued support during movement. These and other additional features and advantages of the device and therapeutic method will be better understood in view of the detailed description provided below.

BRIEF DESCRIPTION OF THE DRAWINGS

To easily identify the discussion of any particular element or act, the most significant digit or digits in a reference number refer to the figure number in which that element is first introduced.

DETAILED DESCRIPTION

Described herein are compositions and methods for providing support to quadrupeds such as equines or canines, or other mammals having four feet, with spinal injury or degeneration. Such compositions and methods may be therapeutic, that is the compositions and methods provide treatment for diseases or disorders of four-footed mammals.

Figure 13:
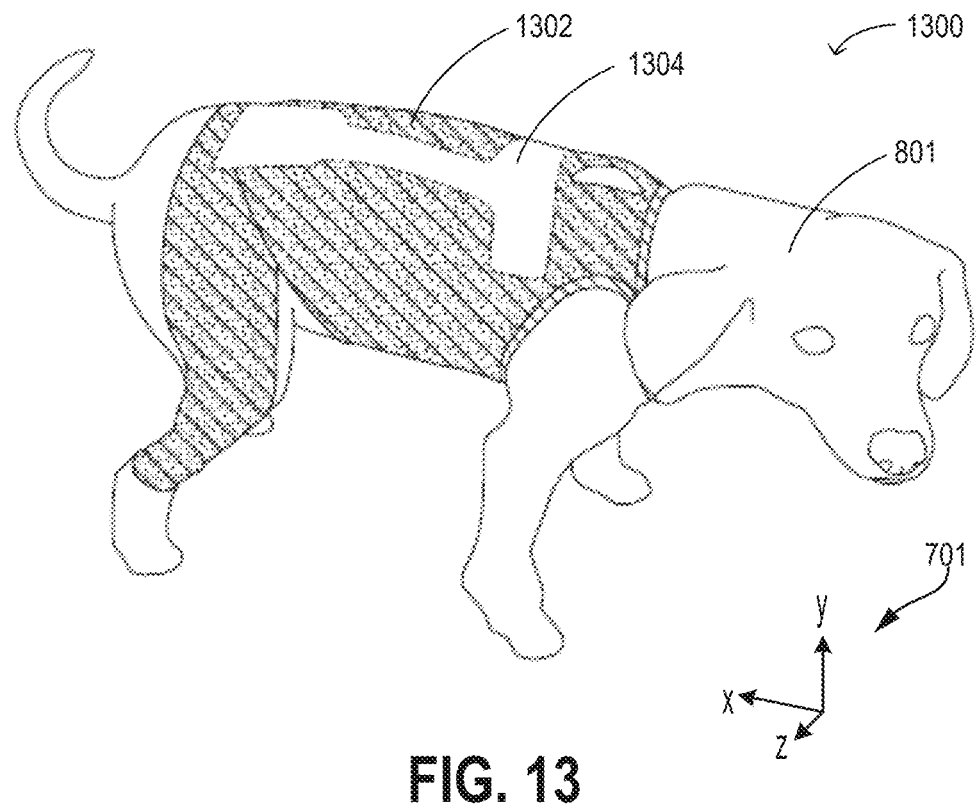
FIG. 13 illustrates an example embodiment of a continuous material compression garment.
Figure 14:
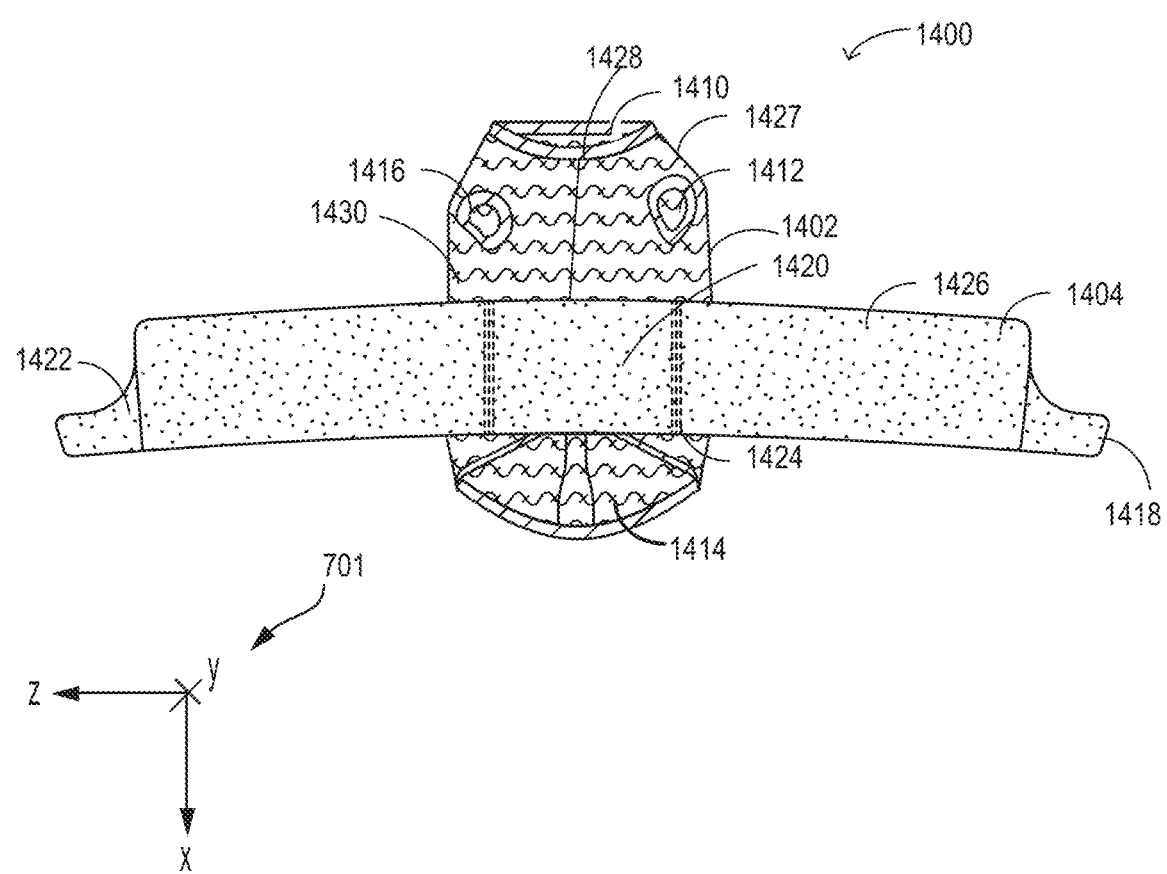
FIG. 14 illustrates an example embodiment of an assembled compression garment.
Figure 15:
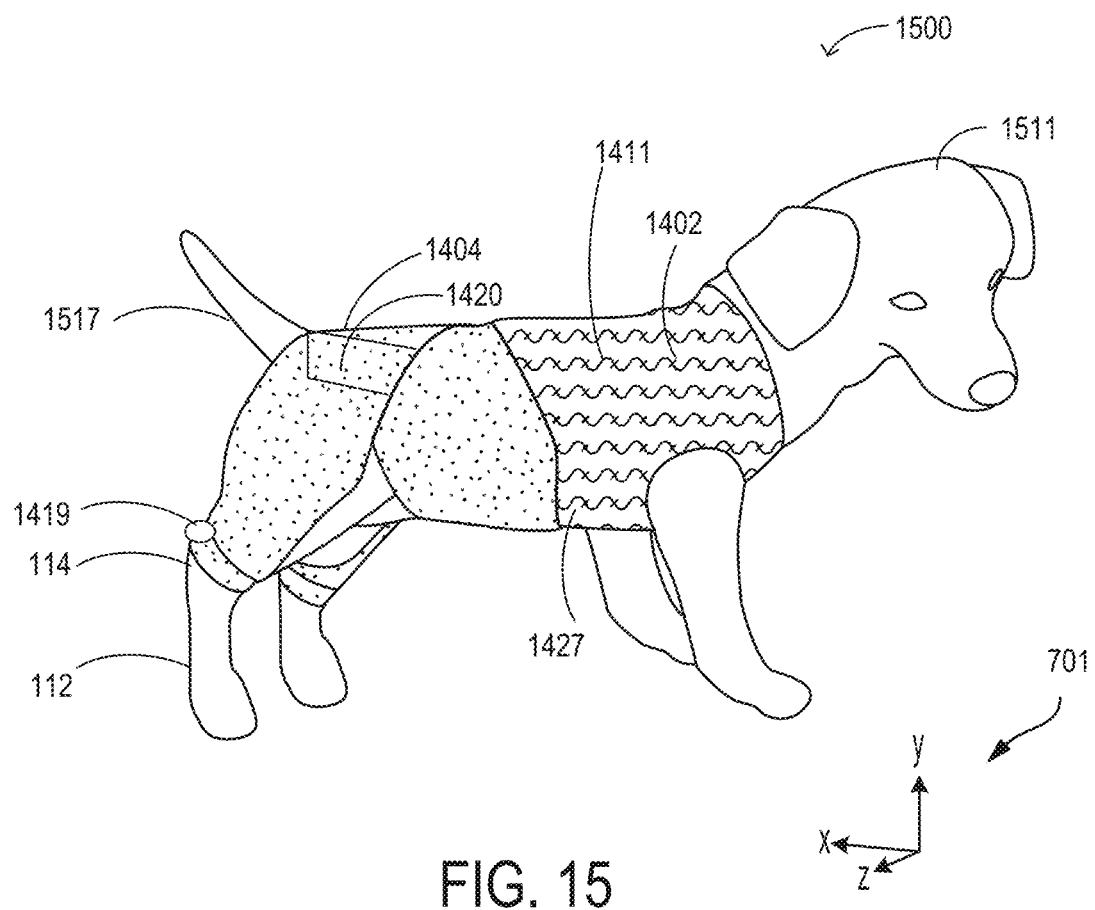
FIG. 15 illustrates a side view of the assembled garment in accordance with the embodiment of FIG. 14.
Figure 16:
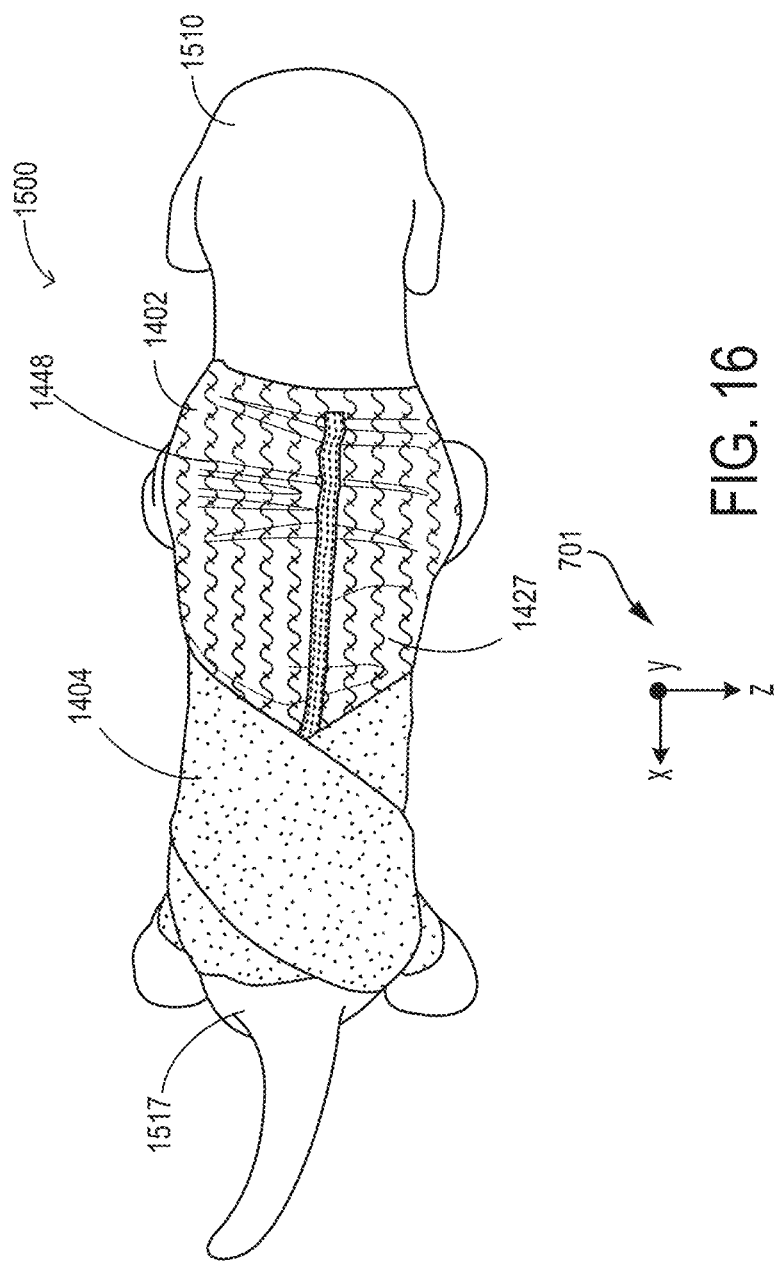
FIG. 16 illustrates a top view of the compression garment in accordance with the embodiment of FIG. 14.

FIGS. 1-6 disclose a variable pressure compression garment with integrated hind leg compression sleeves for support of the hind quarters of quadrupeds suffering from spinal injury or degradation. FIGS. 7-12 disclose a modular compression garment with hind leg compression sleeves that are detachably joinable to a central vest. Such compression sleeves may be used alone or in combination with the central vest. FIG. 13 discloses an integrated compression garment with hind leg compression sleeves integrated with a central vest to provide uniform compression throughout the quadruped's back, torso region, and hind legs. FIGS. 14-16 disclose a modular compression garment with hind leg compression sleeves that are attached to the exterior of a central vest. FIGS. 17-21 disclose a modular compression garment with hind leg compression sleeves that are detachably joinable to a central vest, where the size of the central vest is adjustable along a longitudinal axis as well as a transverse axis. A set of references axes 701, indicating a y-axis, an x-axis, and a z-axis, are provided for comparison between views shown in FIGS. 7-21.

The figures show example configurations with relative position of the various components. If shown directly contacting each other, or directly coupled, then such components may be referred to as directly contacting or directly coupled, respectively, at least in one example. As an example, components laying in face-sharing contact with each other may be referred to as in face-sharing contact. As another example, components shown above/below one another, at opposite sides to one another, or to the left/right of one another may be referred to as such, relative to one another. As used herein, top/bottom, upper/lower, above/below, may be relative to a longitudinal axis of the figures and used to describe positioning of components of the figures relative to one another. Further, components shown intersecting one another may be referred to as intersecting elements or intersecting one another, in at least one example. Further still, component shown within another component or shown outside of another component may be referred to as such, in one example.

The depicted example embodiments provide stability to the hindquarters and spine of a quadruped and distribute weight across the body of the quadruped avoiding strain on localized points of the body. Specifically, the compression garment(s) provides multi-planar support mimicking the natural musculature of the quadruped.

Utilization of the compression garment(s) allows for full range of motion and normal ambulation. Early utilization of the garment in quadrupeds with spinal injury may decrease the development of scar tissue from the injury and may shorten the time needed for recovery.

The multi-planar knit used in the compression garment(s) in either the sleeves or the central vest or both is oriented in accordance with the direction of the muscle fibers found in areas of stress of a quadruped with spinal degeneration or injury. The compression garment of FIGS. 1-6 comprises a compression material with a plurality of compression zones with different amounts of compression. The compression garment of FIGS. 7-21 comprises a garment in which the compression portion(s) of the garment has compression zones of different or uniform amounts of compression. In some embodiments, the compression zones of the compression garment may mimic the superficial pectoral muscles. In one embodiment, the compression garment provides two compression sleeves for the hind legs of the animal which are attached to and/or part of a length of compression material that wraps around the torso of the animal with holes for the forelegs. In some embodiments, the compression sleeves may cover the upper part of the quadruped's legs. In other embodiments, the compression sleeves may cover the length of the quadruped's leg, contoured from the hips to the hock and stifle of the hind leg. The compression garment may further be wrapped around the torso of the animal so that it distributes the supported weight. In some embodiments, the length of the compression material may be wrapped around the torso of the animal a plurality of times allowing for fit adjustment depending on the size of the animal. In other embodiments, the compression garment including a length for the legs may be a single garment.

The compression sleeves may provide the same or different amounts of compression around the leg of the quadruped. Different portions of the compression garment may independently provide the same or different amounts of compression from the compression around the leg of the quadruped throughout the torso of the quadruped. In some embodiments, a higher circumferential compressive force may be located in the posterior extremity portion of the garment while a combination of high and moderate compressive force may be incorporated into the portion of the garment covering the chest of the quadruped. For example, a higher compressive force may be located on the sacroiliac joints with lower levels of compression throughout the remaining portion of the garment surrounding the torso of the quadruped.

In some embodiments, the sleeves of the compression garment may provide a moderate level of circumferential compression at a band just below the hock on the metatarsus, a low level of circumferential compression from above the hock to the stifle increasing to a moderate level of circumferential compression over the stifle and a graduated area of decreasing compression from above the stifle to the top of the thigh of the quadruped. In additional embodiments, there may be an area of high circumferential compression near the top of the thigh with a moderate level of circumferential compression at the junction between the thigh and the body. In other embodiments, the sleeves of the compression garment may provide equal compression between the joints of the quadruped with less compression over the stifle. In further embodiments, the compression garment may apply high levels of compression to the rear of the stifle and a light level of compression over the patella. The transition from one level of compression to another may be independently gradated or abrupt. In still other embodiments, the sleeves of the compression garment may provide equal compression throughout the leg, from the hip to the metatarsal region.

In further embodiments, there may be an area of compression in the portion of the compression garment surrounding the anterior thoracic girdle. There may additionally be anterior extremity holes in the thoracic girdle portion of the compression garment to allow for each anterior extremity to pull through, anchoring the coronal plane. In some embodiments, there may be a higher level of compression edging the anterior extremity holes with the amount of compression gradually decreasing as the garment moves up across the chest of the quadruped. In further embodiments, the amount of compression across the chest of the quadruped may be a combination of medium and high compression. In additional embodiments, the compression garment may have an edging along the exterior sides of its length with a higher level of compression than the compression material between the edgings. In further embodiments, the compression at the top of the legs (anterior extremity holes and upper edging of posterior sleeves) may be a moderate or medium level of compression. In some embodiments, there may be alternating levels of compression across the chest of the quadruped radiating out from the anterior extremity holes. In one embodiment, these alternating levels of compression may be medium and high compression areas.

In some aspects, the compression garment may wrap around the thoracic area of a quadruped evenly distributing the supported weight of the hindquarters. In some embodiments, the portion of the garment wrapped around the thoracic area of the quadruped may comprise a central high compression area with adjacent moderate compression areas on either side of the high compression area. There may additionally be light compression areas on the exterior side of the moderate compression areas (such that the portion of the garment encircling the thoracic area, may, starting along the outer longitudinal area of the garment wrapping around the thoracic area, have a sequentially ordered light compression area, moderate compression area, high compression area, moderate compression area and a light compression area where each area is adjacent to the area listed as preceding and following it). In this instance, adjacent refers to a fabric zone located or formed beside or surrounded, in whole or in part, by another fabric without intervening fabric, parts or other structure.

In some embodiments, the compression garment may comprise a continuous knit continuing from the compression sleeves to rest on the dorsal aspect of the hip to seamlessly continue to a flat band of varying compression material of a generally elongated, rectangular shape that can wrap around the torso of the quadruped. In some embodiments, the width and length of the continuous knit may depend on the size of the animal. In other embodiments, it may be one-size fits all. In additional embodiments, the length and width of the compression garment may be adjustable, allowing a single garment to fit a wide range of sizes.

While the sections of the compression garment may be fastened together by any means known to those of skill in the art including, but not limited to, ties, pins, hook and loop systems, hook and eye, hook and loop systems, buttons, snaps, interlocking shapes, buckles, adhesive tapes, cohesive surfaces, zippers, and other connectors, in some embodiments, the garment may be fastened by threading the ends of the garment through slits located proximate to the middle of the portion of the garment located on the top of the quadruped, allowing for adjustment of the length of the compression sleeves depending on the size of the animal.

In further embodiments, the portion of the garment wrapped around the thoracic area (or torso) of the quadruped may comprise a single vest element having a pair of anterior extremity holes for receiving the anterior (fore) legs of the quadruped. Upon receiving the anterior (fore) legs, the vest is correctly positioned over the thoracic region or torso of the quadruped. In some examples, the vest is a high compression vest for applying and redistributing pressure circumferentially over the thoracic region. In other aspects, the vest may have variable or no compression. In some aspects, the variable compression may be graded. The vest may further include a pair of posterior holes or slits through which the single compression sleeve is threaded. After threading the compression sleeve through the two slits, such that each end of the compression sleeve is symmetrically positioned over the hip region, posterior legs of the quadruped are received in the compression sleeve. In other embodiments, the compression sleeve may be attached to the vest. The positioning of the compression sleeves and the vest redistributes the weight from the hind legs to the rest of the body. In some embodiments, the compression garment may comprise a continuous knit continuing from the compression sleeves to rest on the dorsal aspect of the hip to seamlessly continue to a flat band of uniform compression material of a generally elongated, rectangular shape that can wrap around the torso of the quadruped. In still further embodiments, the vest and compression sleeve may be integrated into a single garment applying uniform compression over the quadruped's body. In some embodiments, the length and/or width of the central vest may be adjustable, allowing a single garment to fit a wide range of sizes.

The compression garment, whether a single length of material, or a vest and sleeve, may use any type of material that can be constructed to provide variable and/or graded levels of compression. Such materials include fabrics that provide variable compression of between about 10 mmHg and about 40 mm/Hg, wherein about indicates +/−10%.

Compression may be varied, for example by yarn type and size, characteristics of yarns utilized, warp, weft, and fabric structure, such as stitch size. Along with different fiber blends, different fabric construction methods can be used such as weaving and knitting. The elasticity (stretch) and the modulus (compressive power or force, e.g. ratio of tensile stress to tensile strain) are different in the two orientations of the fabric: warp or length direction (generally attached to a loom before weaving begins) and the width or weft direction (generally woven in front of and behind the warp). Elasticity of a fabric may be determined where X=the original width; Y=the width after stretching−X; and (Y/X)*100=stretch percentage. In some embodiments the amount of elasticity in the compression garment may be between about 100-180% for the warp and 70-140% for the weft. In some embodiments, the material construction may provide 200% length× 200% width stretch with power and modulus results in both directions. Such elasticity and modulus depend on the type of fibers used in construction of the fabric. In other examples, the fabric has the same level of compression throughout its length and width.

In some embodiments, the compression garment may be manufactured using elastane (spandex). Spandex is a complex, synthetic, elastomeric material with stretch up to 500-600% and may be blended with many other types of fibers such as polyesters, cottons, nylons and others commercially available. In some aspects, the material may be a mesh with regularly spaced openings. Generally, in some embodiments, the compression garment may comprise approximately 76% 140 denier micro-nylon and 24% 280 denier LYCRA spandex. In further embodiments, the amount of compression in each portion of the compression garment may be adjustable. In some embodiments, the compression material may comprise the compression fabric described in U.S. Pat. No. 9,204,986, with different high, moderate and low compression points. For example, it may be formed of a closed-loop jersey-knit body yarn comprising micro-nylon, moisture wicking fibers, and/or other natural or synthetic fibers and blends.

The compression material can be manufactured to have a range of elongation, modulus, and breathability characteristics suitable for use on a quadruped. The range of elongation, modulus, and breathability characteristics may be adjusted depending on the fiber component composition used or chemical treatment to the fabric during finishing. Such treatments are known to those of skill in in the art.

The compression garment described herein may be more fully understood with reference to the accompanying drawings which show one or more exemplary embodiments. The compression garment, however, should not be construed as limited to the embodiments set forth herein as these embodiments are illustrative.

Figure 1:
FIG. 1 illustrates an exemplary embodiment of a completed alignment of a quadruped compression garment.
Figure 1:
Figure 1:
Figure 1:
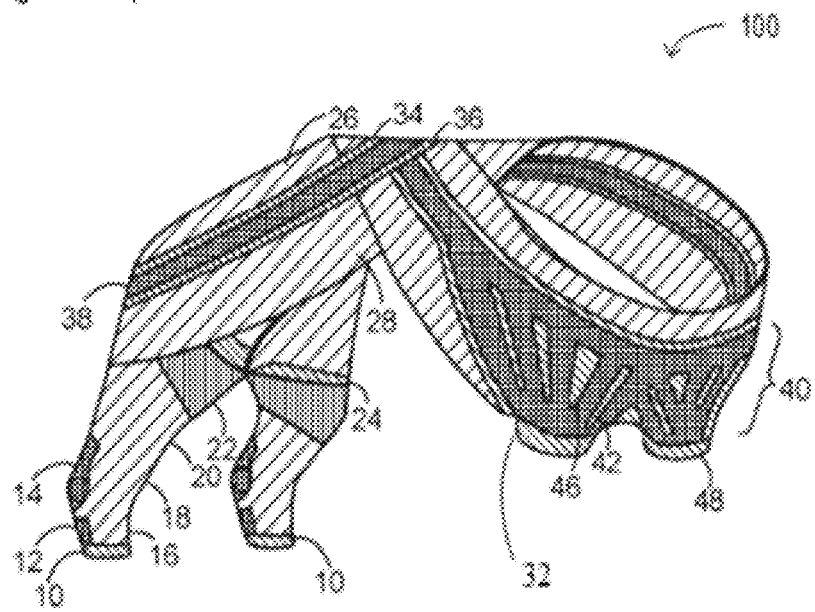
Figure 2:
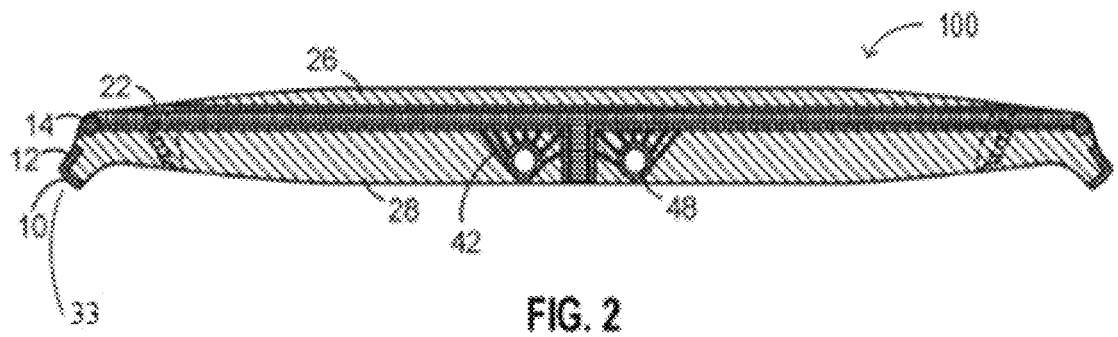
FIG. 2 illustrates a top view of a continuous material compression garment in accordance with the embodiment of FIG. 1.
Figure 3:
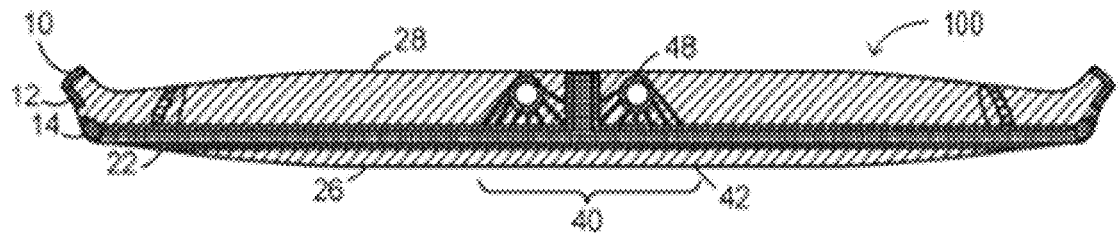
FIG. 3 illustrates a bottom view of a continuous material compression garment in accordance with the embodiment of FIG. 1.
Figure 4:
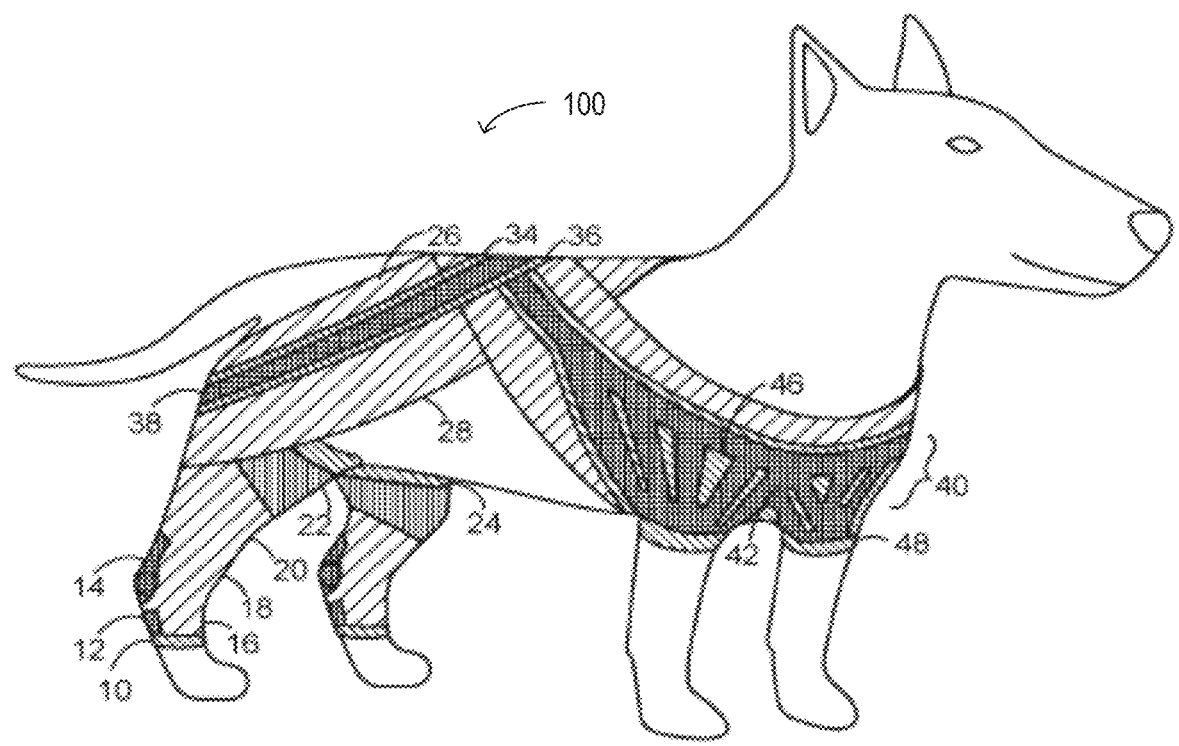
FIG. 4 illustrates a side view of a compression garment on a canine in accordance with the embodiment of FIG. 1.
Figure 5:
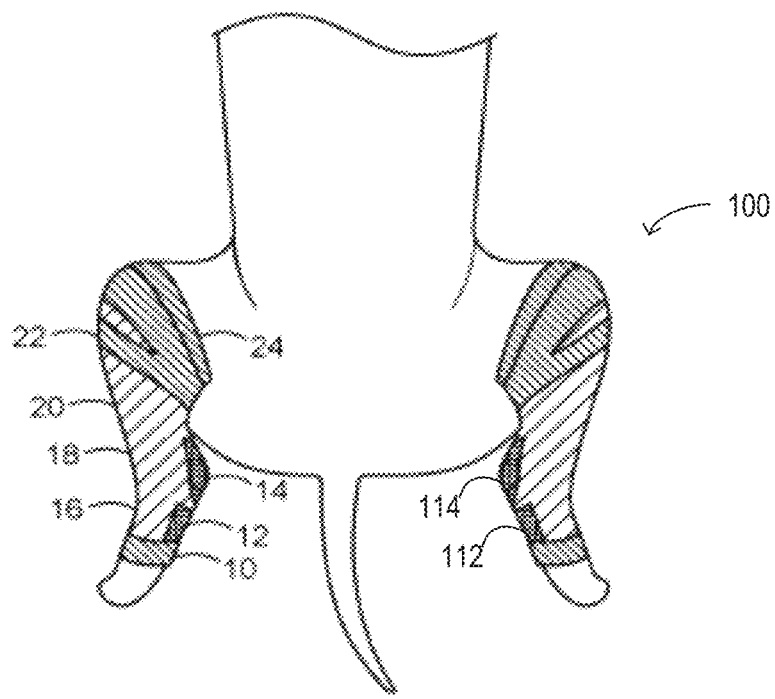
FIG. 5 illustrates a ventral view of a compression garment on a canine in accordance with the embodiment of FIG. 1.
Figure 6:
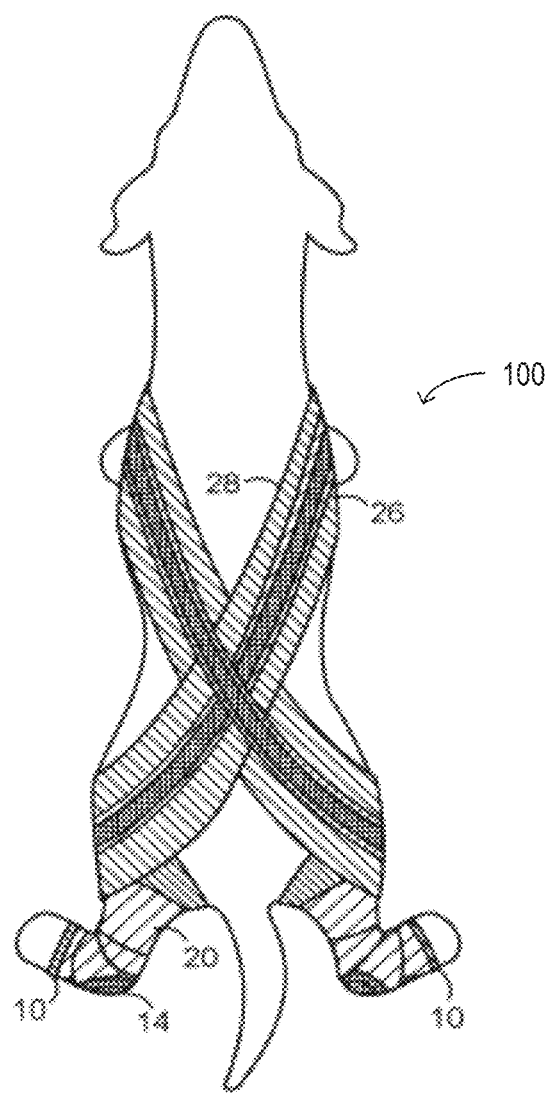
FIG. 6 is a dorsal view of a compression garment on a canine in accordance with the embodiment of FIG. 1

FIG. 1 shows an example embodiment of a wrapped compression garment without a quadruped. FIG. 2 provides a top view of an embodiment of the unwrapped compression garment. FIG. 3 provides an underside view of an embodiment of the unwrapped compression garment. FIG. 4 provides a side view of an embodiment of a compression garment on a quadruped from the side. FIG. 5 provides a ventral view of a canine wearing an embodiment of the compression garment. FIG. 6 provides a dorsal view of an embodiment of a canine wearing an embodiment of a compression garment. FIGS. 1-6 pertain to the same embodiment.

Referring to FIGS. 1-6, a garment 100 has a first moderate compression zone 10 adapted for applying substantially circumferential compression to a hind metatarsus of the quadruped with an opening 32 for each anterior leg of the quadruped and an opening 33 for each posterior leg of the quadruped as shown in FIGS. 4-6. In some embodiments, the compression zones comprise elastic yarns integrated with a body yarn. While any suitable compression fabric may be used, in some embodiments the compression fabric may incorporate an elastomeric material such as spandex with another fiber such as nylon. In some embodiments, the compression garment may be made of breathable material. A third high compression zone 12 is located over the rear metatarsal area while a first high compression zone 14 is placed over the hock to provide support to the Achilles tendon. These areas of high compression are balanced with a light compression zone providing substantially circumferential compression between the rear metatarsal area 112 and hock 114, first light compression zone 16 in front of the hock, second light compression zone 18 over the patella and a third light compression zone 20 applying substantially circumferential compression at the top of the thigh. The anterior portion of the compression garment applies second light compression 18 over the patella and a first light compression area 16, allowing for extension and flexion of the hind leg. A band 24 of fourth light compression above the knee applies substantially circumferential compression while allowing for freedom of movement. The compression garment continues across the top of the quadruped with a fourth zone of light compression 26 and 28 on the exterior sides of the compression garment covering the hips of the quadruped and continuing across the back. The amount of compression increases towards the middle of the garment across the hips and body, progressing from the fifth zones of light compression 26 (upper) and 28 (lower) to second moderate compression zones at 34 (upper) and 36 (lower) and a central fourth zone of high compression 38. The fifth zones of light compression 26 and 28, second moderate compression zones 34 and 36, and central fourth zone of high compression 38 continue along the back of the quadruped until reaching the chest 40 of the quadruped. The chest comprises a fifth zone of high compression 42 interspersed with third moderate compression zones 46 interspersed through the fifth zone of high compression 42. Fifth zone of high compression 42 interspersed with the third moderate compression zone 46 radiates upwards from a band 48 of moderate compression surrounding the top of the anterior (fore) legs of the quadruped, the band allowing the anterior legs to poke through openings 32 of the compression garment, assisting in keeping the compression garment in place while allowing full range of motion for the anterior legs. The second moderate compression zones 34 and 36 continue along either side of the fifth zone of high compression 42 interspersed with the third moderate compression zone 46. The second moderate compression zones 34 (upper) and 36 (lower) continue along the exterior of the fifth zone of high compression 42, with the upper fifth zone of light compression 26 continuing across the chest along the second moderate compression zone 34 with the lower fourth light compression zone 28 re-joining the exterior for the lower second moderate compression zone 36 to continue the wrap across the back of the quadruped.

Targeted compression in the various circumferential zones of the compression garment may be graduated by integrating elastic yarns of strategic lengths with the body yarn in the different axially divided garment regions. The amount of compression may be altered by increasing the length of the elastic yarns. Low compression areas may be between 10-15 mmHg. Moderate compression zones may be between 15-20 mmHg. High compression zones may be greater than 20 mmHg. In some embodiments, high compression zones may be between 20 and 30 mmHg.

As shown in FIGS. 4-6, varying circumferential compression against the hind legs and body can be achieved at different parts of the compression garment. The compression is consistent with the shape of the legs and body so that it compresses the venous system, decreasing swelling in the lower extremities. It follows the natural musculature of the quadruped, providing appropriate support to quadrupeds with spinal degeneration or injury.

Further structural support is provided by the lift created by concentrated high compression along the Achilles tendon at 12 and 14, and a fourth zone of moderate support across the knees 22. The cooperating levels of compression are sufficient to provide lift and support, but not create restriction and discomfort to the wearer.

Figure 8:
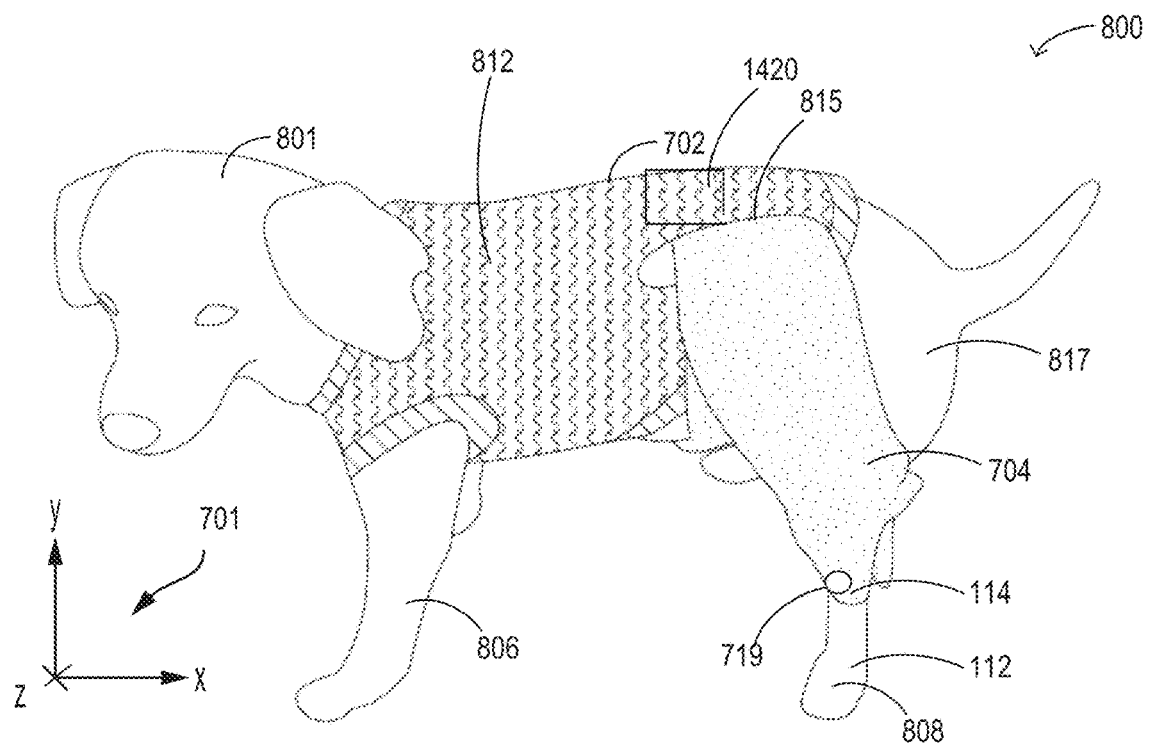
FIG. 8 illustrates a side view of a compression garment on a canine in accordance with the embodiment of FIG. 7.
Figure 9:
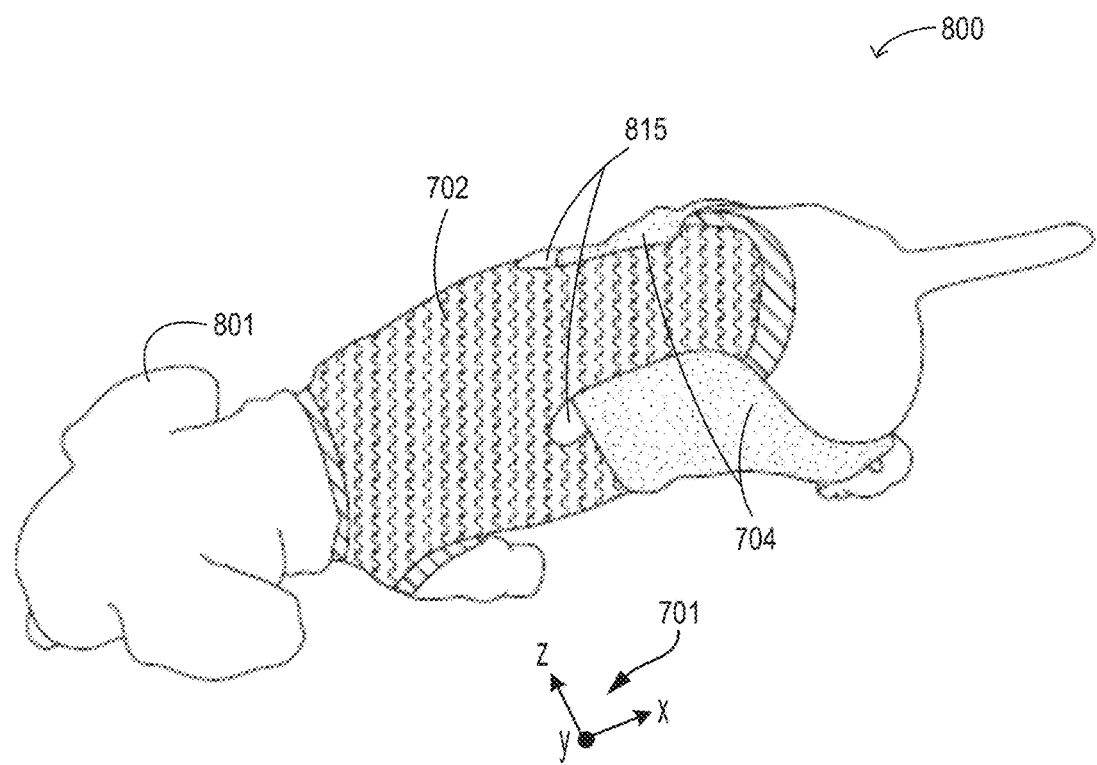
FIG. 9 illustrates a top view of a compression garment on a canine in accordance with the embodiment of FIG. 7.
Figure 10:
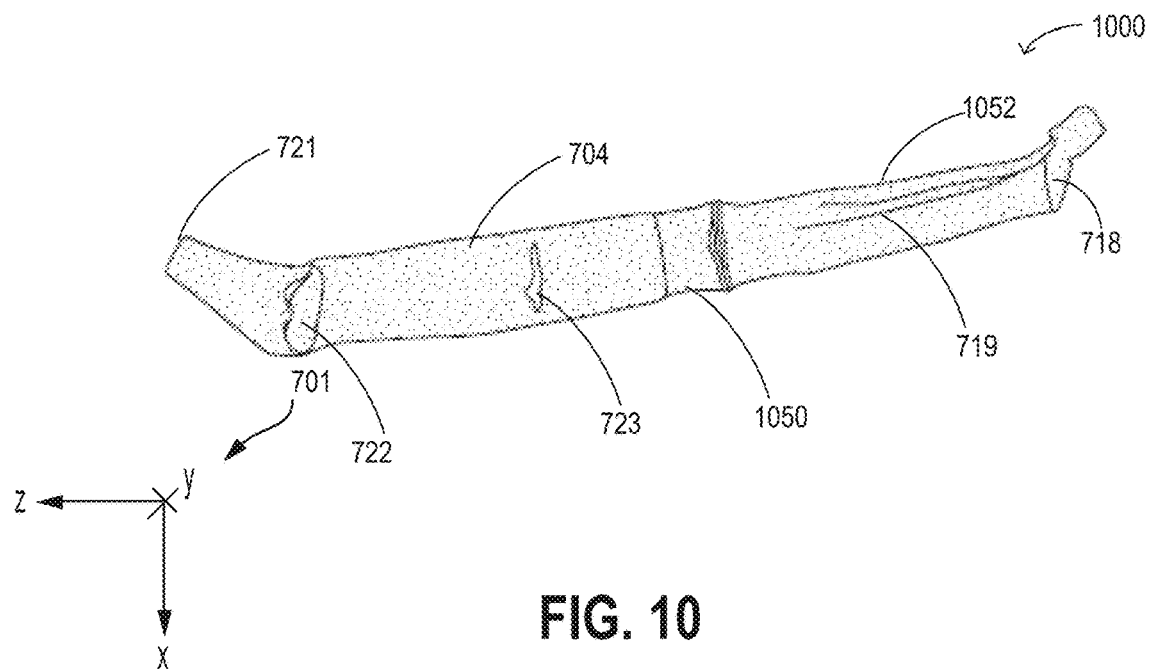
FIG. 10 illustrates an exemplary embodiment of a continuous material compression garment for a quadruped.
Figure 11:
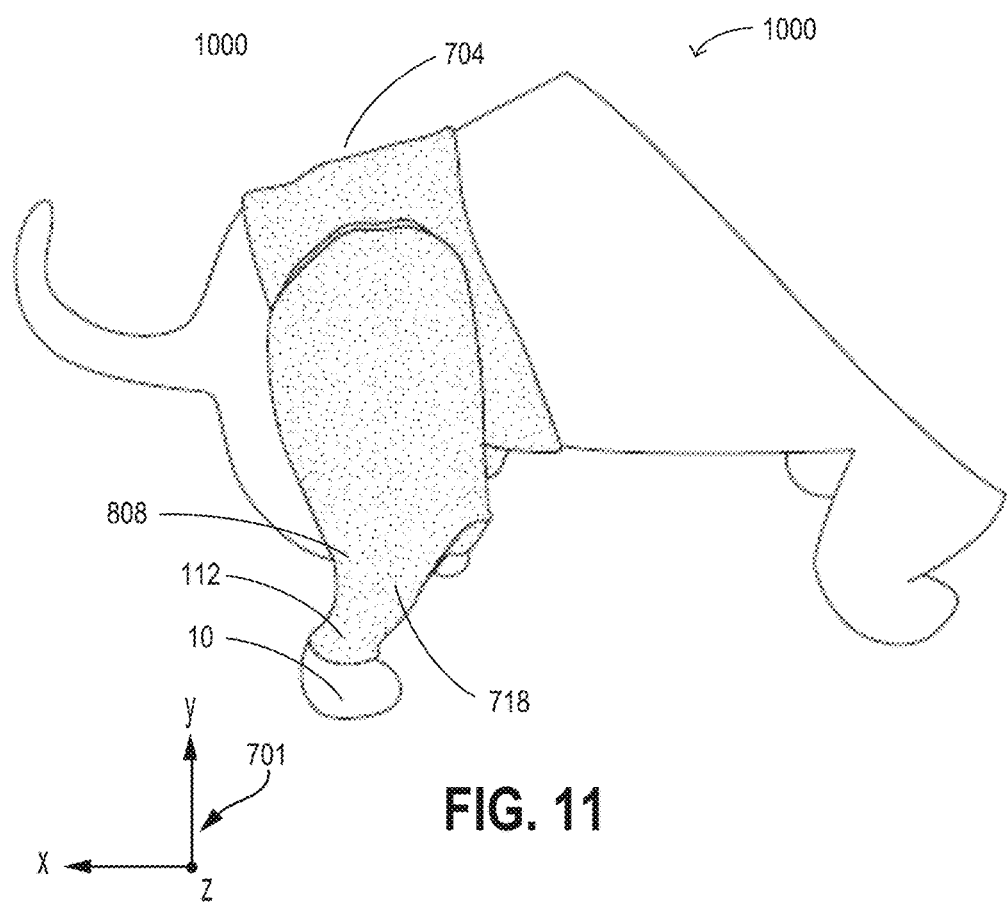
FIG. 11 illustrates a side view of a continuous material compression garment on a canine in accordance with the embodiment of FIG. 10.
Figure 12:
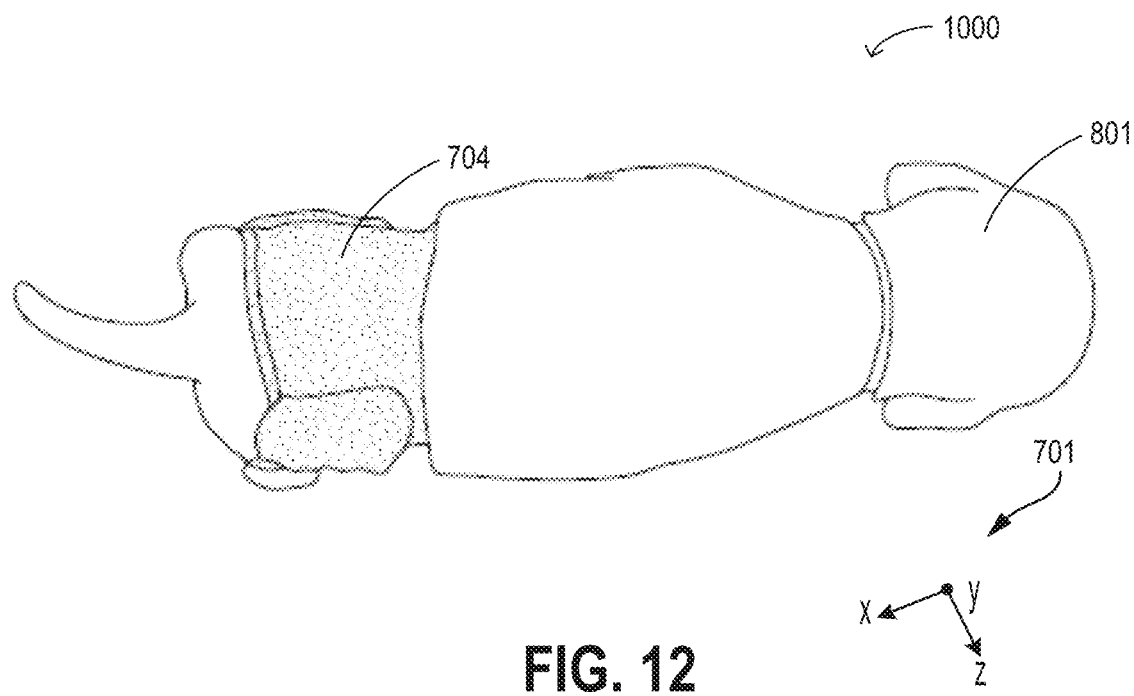
FIG. 12 illustrates a top view of a continuous material compression garment on a canine in accordance with the embodiment of FIG. 10.

In some aspects, the length of material shown in FIGS. 2-3 may also be modified to be used as a compression sleeve extending across the rear hindquarters in combination with a compression vest of the quadruped as shown in FIGS. 7-12, 14-16, and 20-21 or as a simplified compression sleeve as shown in FIGS. 10-12. For example, the anterior openings 32 may be removed and the length of fabric may be shortened while still providing the variable compression shown at zones 10, 12, 14, 16, 18, 20, 22, 24, and 28 in the form of a compression sleeve.

Figure 7:
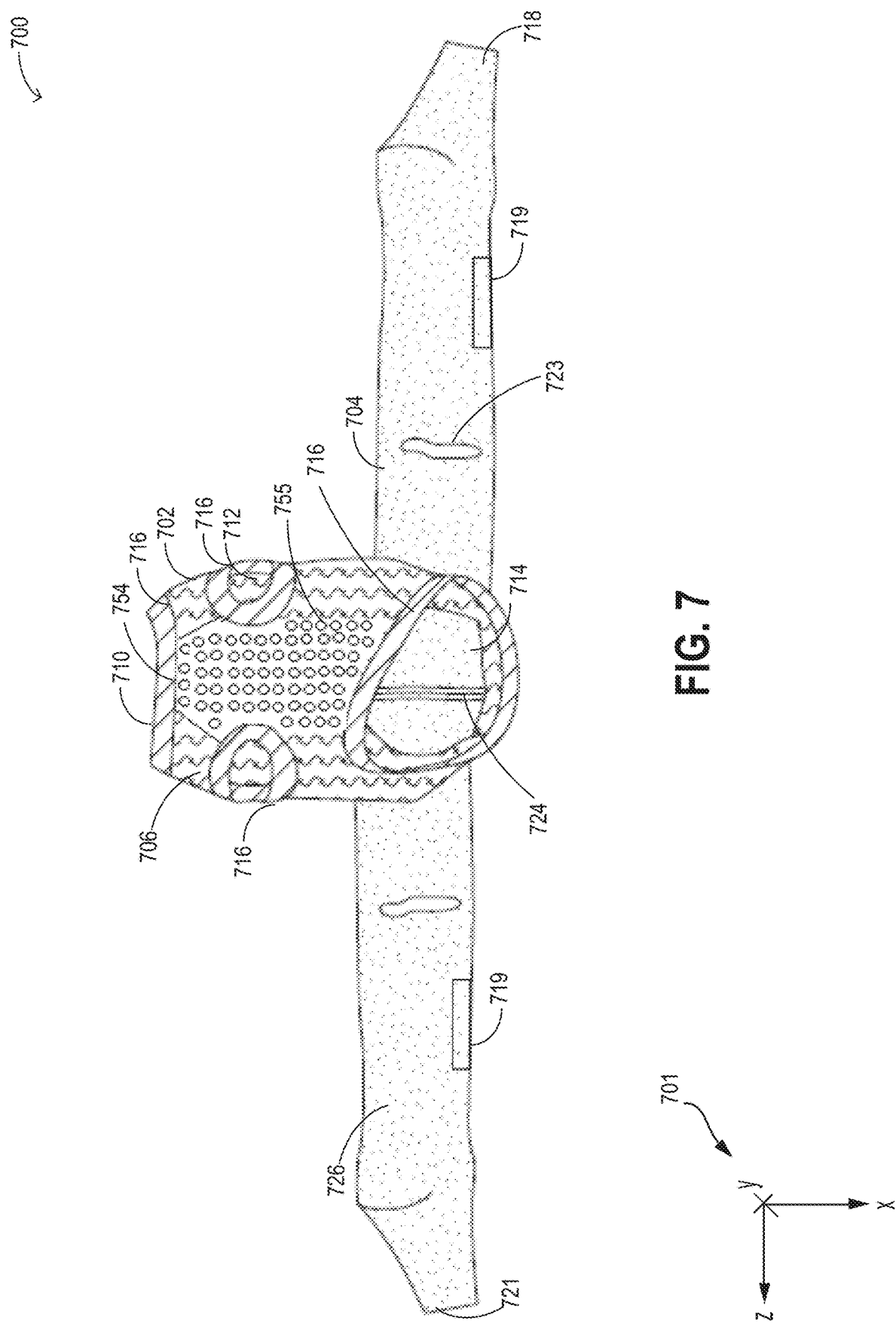
FIG. 7 illustrates an example embodiment of an assembled compression garment for a quadruped.

FIGS. 7-9 show an embodiment 700 of a compression vest and sleeve for a quadruped. FIG. 7 shows the combined vest and sleeve, laid out. FIGS. 8-9 show side and top views of the assembled garment 800 when worn by a quadruped 801. In the depicted example, the quadruped is a canine though the embodiment applies to other quadrupeds including equines. The description below refers to any or all of FIGS. 7-9.

The embodiment 700 includes a central vest 702 coupled to a compression sleeve 704. The embodiment is a modular embodiment with the central vest and compression sleeve provided as separate units that can be coupled to each other or worn separately. When coupled, the compression sleeve 704 provides circumferential or annular compression on hind legs of a quadruped, while the central vest redistributes the weight from the hind legs to a thoracic region (or torso) 812 of the quadruped's body, thereby relieving weight and stress from the spinal region. As shown, the compression sleeve covers and applies compression to the rear metatarsal region 112 and hock 114 though different lengths of compression sleeves may also be used.

In some aspects, the compression is consistent with the shape of the legs and body so that it compresses the venous system, decreasing swelling in the lower extremities. It follows the natural musculature of the quadruped, providing appropriate support to quadrupeds with spinal degeneration or injury.

Figure 17:
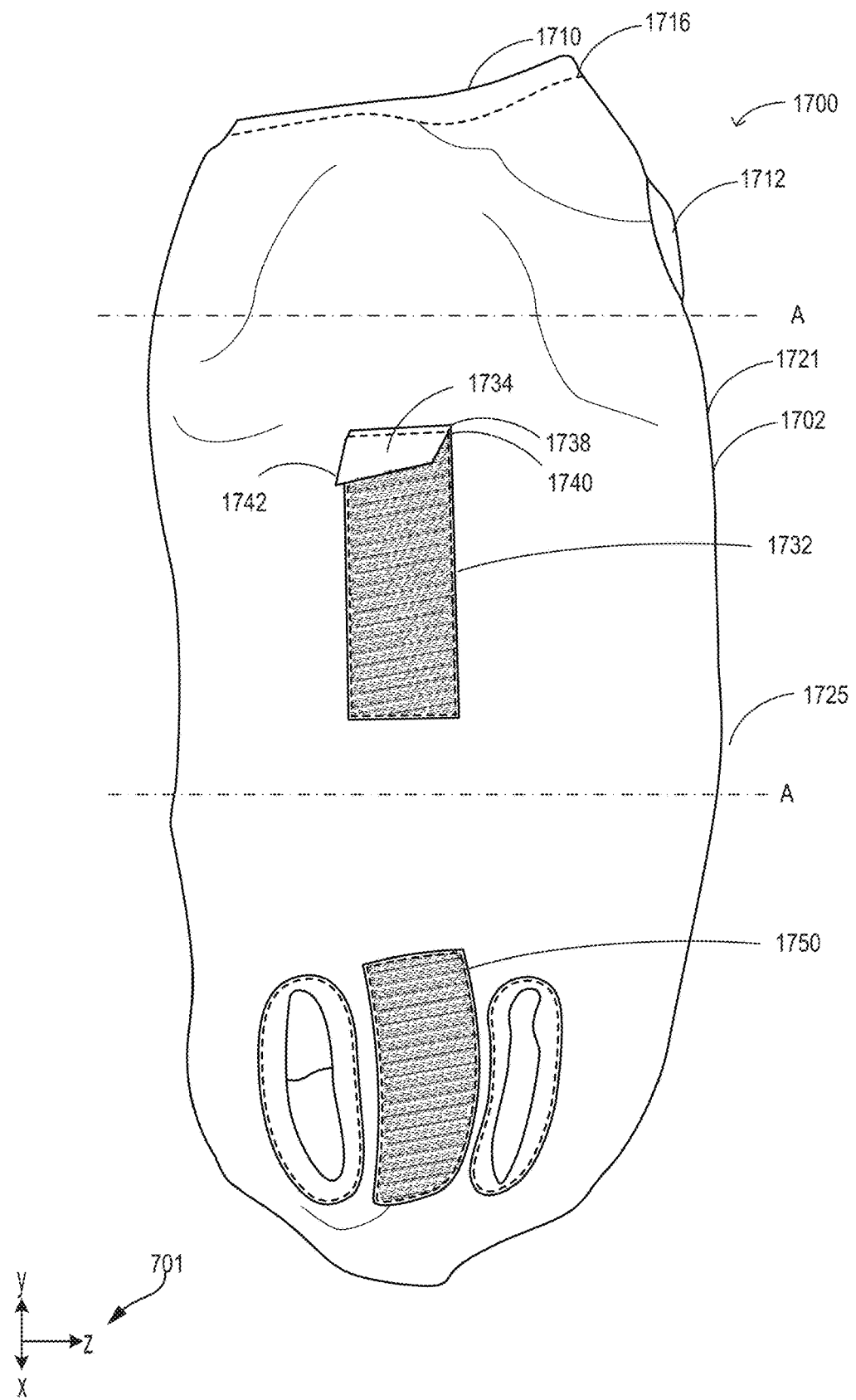
FIG. 17 illustrates a top view of an exemplary central vest.
Figure 20:
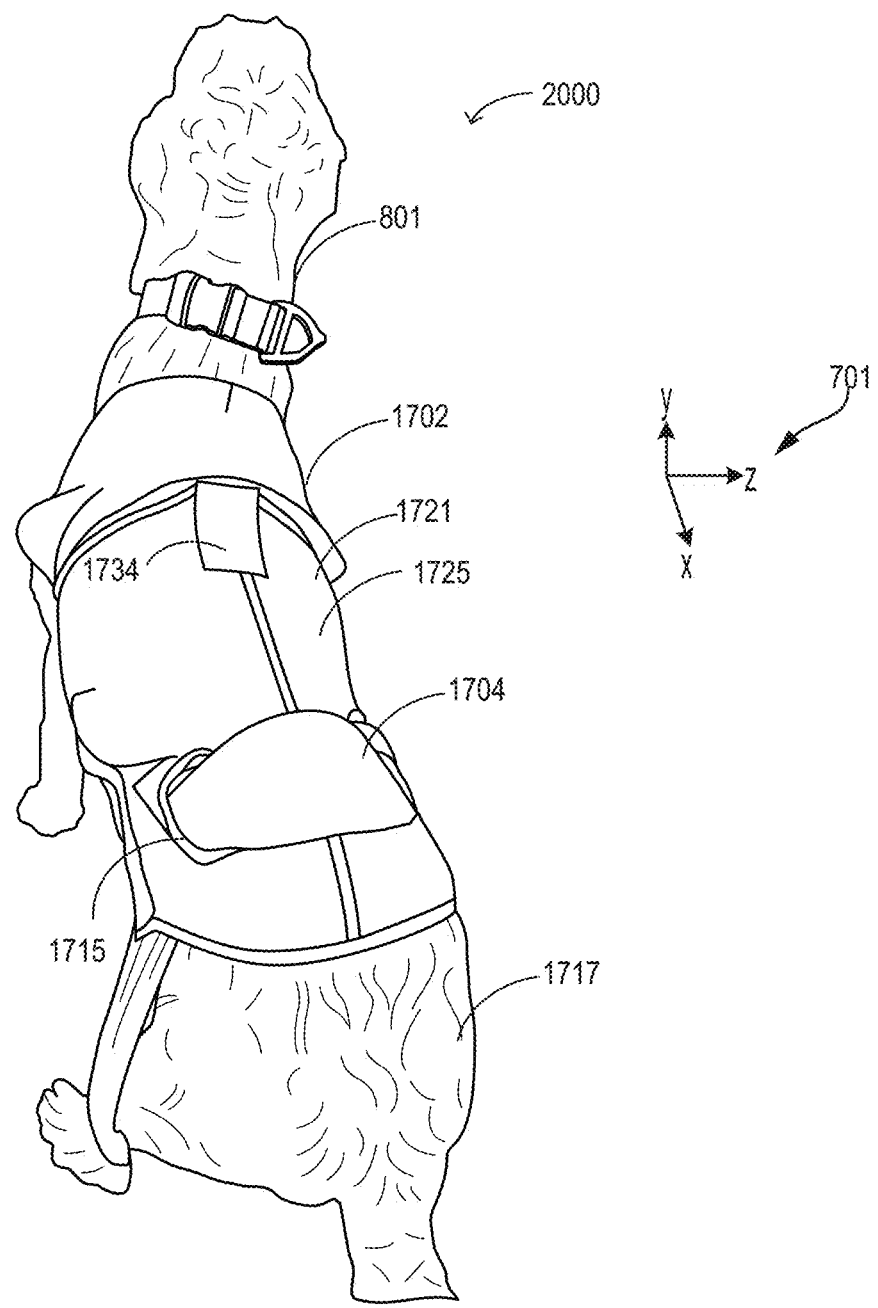
FIG. 20 illustrates a top view of a compression garment including the central vest of FIG. 17.
Figure 21:
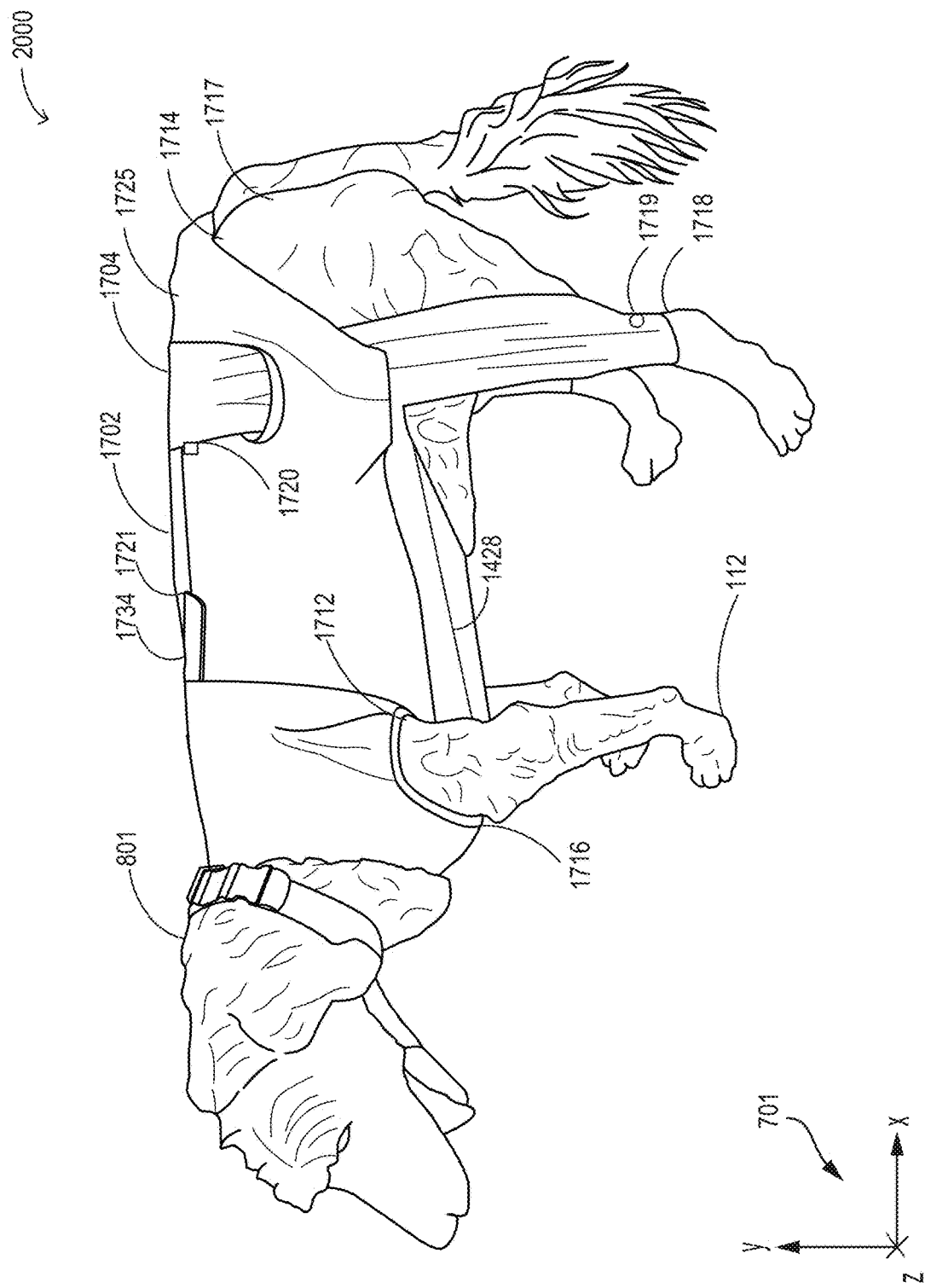
FIG. 21 illustrates a side view of a compression garment including the central vest of FIG. 17.

The compression sleeve and the central vest may be operatively or directly coupled. For example, the compression sleeve 704 may be threaded through the smaller dorsal posterior openings 815 in the central vest across the back of the quadruped. In some aspects, the compression sleeve 704 may be freely moveable. In other aspects, the compression sleeve 704 may be attached to the vest by any means generally used. In some aspects, it may be attached using hook and loop fabrics such as Velcro®, buttons, hooks and eyes, snaps, ties, or buckles or any combination thereof. For example, there may be a fastening means between the central vest 702 and the compression sleeve 704 as shown in further detail in FIGS. 14 and 17. In some aspects, such a fastening may be between the smaller dorsal posterior openings 815 on the dorsal side of the vest. In other aspects, such a fastening means may be on the inside of the vest 702 as shown by the optional attachment point 724, on the underside of the vest as shown at 1424 in FIG. 14, or on the upper side of the vest at 1750 as shown in FIGS. 20-21. In some aspects, once the compression sleeve is properly positioned, it may be releasably attached to the central vest using a fastening means such as fastening means 1750 (second attachment point) as shown in FIG. 17.

Central vest 702 is configured substantially cylindrically with a primary anterior opening 710 through which an anterior region of the quadruped (including head) is exposed when the vest is worn, and a primary posterior opening 714 though which a posterior region 817 of the quadruped (including rump, loin, and tail) is exposed. Further, a pair of smaller anterior openings 712 are provided for receiving the anterior (fore) legs 806. The pair of openings are symmetrically positioned along a central longitudinal axis of the vest, and closer to the anterior opening 710 than the posterior opening 714. Each opening may be lined via a cuff 716 to provide comfort when the vest is worn, and to reduce the likelihood of allergic reactions. The cuff 716 may be made of the same or a different material than both the central vest and the compression sleeve. In some aspects, the cuff 716 may be formed as one piece with the compression sleeve.

The vest, and corresponding openings, may be designed in predefined sizes matching predefined sizes of the quadruped, such as small, medium, and large. Alternatively, the vest may be configured with an underbody (ventral side) or spinal (dorsal side) fastening mechanism which allows the vest to be fitted to the girth and length of the quadruped's central body form. In some aspects, the central vest may be made of a single fabric. In other embodiments, the central vest may be made of a plurality of fabrics with the same or different levels of compression. For example, the compression vest may have a belly panel as shown at 754. Such a panel may be made of the same or different types of material as the rest of the vest. For example, the belly panel 754 may be made of a breathable mesh.

In some aspects, the central vest may include a pouch or pocket 1420 into which hot or cold packs or other therapeutic agents may be placed. The pocket may be shaped and sized to fit the desired cold pack, hot pack, or other therapeutic agent. The pocket or pouch may be fixed to the central vest or detachable. In some aspects, the pocket or pouch may have a first, upper layer and a second, lower layer forming an exterior and an interior of the pocket. In some embodiments, the second, lower layer may be the portion of the central vest at the point of attachment of the upper layer, that is, the first, upper layer, may form a pocket when coupled with the central vest. In other embodiments, the second, lower layer, of the pocket may be an additional portion of fabric and the second, lower layer attaches to the central vest. In some examples, the pocket may be sealed on three sides, leaving a single opening though which the heat and cold packs may be inserted. For example, the first, upper layer may be sealed to the second, bottom layer. In other aspects, the first, upper layer, may be sealed to the central vest. In additional embodiments, the first, upper layer, and the second, lower layer may be made from a single piece of material such that only two sides need to be sealed to create a pouch or pocket. In other embodiments, the pocket or pouch may be open on opposite ends as shown in FIG. 14. The pocket or pouch may also be closable, that is it may be sealed on three sides and the open side may include a fastener or flap to close the opening. Any fastener generally used by one of ordinary skill in the art may be used to close the opening, including, but not limited to, hook and loop fastenings, hook and eye fastenings, buttons, snaps, ties, buckles or other fastenings generally known to those of ordinary skill in the art. The pocket may be made of the same or different material than the central vest. While the pocket may have any shape generally used, in some aspects it is generally square or rectangular.

In other aspects, the pocket or pouch may be detachable, allowing for hot and cold packs to be applied where needed. Such a pocket or pouch may attach to the central vest in any way generally used, for example via hook and loop fastenings, hook and eye fastenings, buttons, snaps, ties, buckles or other fastenings generally known to those of ordinary skill in the art. In some aspects it may be placed between the compression sleeve and the compression vest.

The central vest 702 includes two dorsal slits or smaller dorsal posterior openings 815 (FIGS. 8-9) through which the compression sleeve 704 is threaded. Upon threading, each end 718 of the compression sleeve is positioned on either side of a longitudinal axis of the vest, and the quadruped 801. The ends 718 may be tapered and contoured such that they fit the hock and ankle region of the quadruped. In alternate examples, the ends may have a fastening element 719, such as buttons, hook-and-loop fasteners, hook and eye fasteners, buttons, snaps, ties, buckles, etc., via which the end may be fastened with a desired degree of tightness around the quadruped's ankle. Opening 722 in the compression sleeve receives a hind leg 808 of the quadruped, which is to be compressed, to be inserted into the corresponding end of the compression sleeve 704 at 722 and exit at 721. The fit of the compression sleeve may be adjusted through the use of opening 723 which allows for one end 718 to be inserted to wrap the compression sleeve around the hind quarters of the quadruped, adjusting the fit of the compression sleeve to the girth of the animal.

In some aspects, the central vest may be made of a compression material 706 (curved hatching), as described earlier with reference to the first embodiment of FIGS. 1-6. Alternatively, the central vest may be made of nylon or other non-compressive materials. In one example, the compression sleeve 704 is made of a material 726 (dotted pattern) having high compression while the vest is made of a material 706 (wavy pattern) having lower compression (such as no compression). When made of compression material, the material may be of variable compression, including distinct compression zones of varying pressure (such as any combination of zones of light, medium, and high compression), for example the material 726 may have variable compression levels as shown in FIGS. 2 and 3. Alternatively, the central vest may be made of a material of uniform compression (which may be light, medium, or high compression throughout). In some aspects, the vest 702 may additionally include a belly band 754 of a mesh with openings 755.

FIGS. 10-12 show an example embodiment 1000 wherein only the compression sleeve 704 is used. Such a compression sleeve 704 may have continuous or variable compression. For example, it may have compression zones similar to those shown in FIGS. 2-3. In the depicted embodiment, a first end 718 is configured to be tapered. In other embodiments, the width of the compression sleeve 704 may be adjusted using a fastening element such as fastening element 719 to produce a tapering effect as shown at 1052. The fastening element 719 can be any fastening element generally used including hook and eye, hook and loop, snaps, buttons, ties, buckles and the like. In some instances it may be self-adhering. In other instances, the fastening element 719 may use a mating portion on an opposite side of the compression sleeve 704. Varying types of exemplary fastening devices are shown in FIGS. 7, 8, and 10.

In some aspects, a length 1050 of the compression sleeve between the ends 718 may be configured based on the size of the quadruped (e.g., small, medium, large, etc.). In particular, a first hind leg of the quadruped is inserted into the tapered end of the compression sleeve. Then, the remainder of the compression sleeve is wrapped over the hind region of the animal, one or more times around. After wrapping, the other remaining end 718 of the compression sleeve is inserted through opening 721, the remaining hind leg is inserted into the remaining sleeve and fastened via the fastening mechanism 719. In this embodiment, compression is selectively applied to the hock region 114. An example of a canine wearing only the compression sleeve is shown at FIGS. 11-12. In these examples, the compression sleeve can be worn without the need for the vest.

In still another further example embodiment 1300, shown at FIG. 13, the compression sleeve and vest are integrated into a single garment 1302. The single garment 1302 may be made of uniform or variable compression material having variable compression similar to that shown in FIGS. 2-3. If uniform compression material is used, the same degree of pressure is applied through the torso and hind region of the animal while the integrated garment allows the body weight to be distributed away from the spinal region.

An optional handle 1304 may be sewn into the garment, on the top surface, substantially on a dorsal side of the animal when the garment is worn. The handle allows a human working with the quadruped to further relieve pressure from the animal's spinal region. Alternatively, the handle may be used to lift the animal. When included, the handle may be made of a material that is not compressive. The handle 1304 may be optionally included on the central vest of other embodiments shown herein.

FIGS. 14-16 show an example embodiment 1400 of a compression garment for a quadruped in which the compression sleeve is coupled to the exterior of the compression vest. FIG. 14 shows combined vest and compression sleeve, laid out. FIGS. 15-16 show side and top views respectively of the example embodiment 1400 when worn by a quadruped. In the depicted example, the quadruped is a canine though the garment could be worn by any four-legged animal. The description below refers to any or all of FIGS. 14-16.

The example embodiment 1400 includes a central vest 1402 coupled to a compression sleeve 1404. In this embodiment, the compression sleeve 1404 is attached to the underside 1430 of the posterior of the vest 1402. The compression sleeve 1404 provides circumferential or annular compression on hind legs of a quadruped, while the vest redistributes the weight from the hind legs to a thoracic region (or torso) 1411 of the quadruped's body, thereby relieving weight and stress from the spinal region. In particular, the compression sleeve covers and applies compression along the leg to below the knee cap. In some embodiments, the compression sleeve may extend to cover the stifle, hock 114, and rear metatarsal 112. Attaching the compression sleeve 1404 to the underside of the vest 1402 allows for the compression sleeve to be wrapped around the torso 1411 in a cantilevered manner as shown in FIG. 15. In some embodiments, this relieves the pressure from the lumbar spine. This configuration may also compress and pull the hips of the quadruped inwards, providing additional support.

As shown in the image 1500 of the quadruped wearing the garment shown at FIG. 14, central vest 1402 is configured substantially cylindrically with a primary anterior opening 1410 through which an anterior region of the quadruped 1510 (including head) is exposed when the vest is worn, and a primary posterior opening 1414 though which a posterior region 1517 of the quadruped (including loin, and tail) is exposed. Further, a pair of smaller anterior openings 1412 are provided for receiving the anterior (fore) legs. The pair of openings are symmetrically positioned along a central longitudinal axis of the vest, and closer to the anterior opening 1410 than the posterior opening 1414. Each of the posterior and anterior openings of the vest may be lined via a cuff 1416 to provide comfort when the vest is worn, and to reduce the likelihood of allergic reactions. The cuff 1416 may be made of same or different material than both the central vest and the compression sleeve. In some aspects, the cuff and the compression sleeve may be made of a singular piece of fabric.

The vest, and corresponding openings, may be designed in predefined sizes matching predefined sizes of the quadruped, such as small, medium, and large. Alternatively, the vest may be configured with an underbody (ventral side) fastening mechanism, such as fastening mechanism 1428 which allows the vest to be fitted to the girth of the quadruped's central body form. Alternatively or additionally, the length of the vest may be adjustable as shown by pleats 1448 in which excess material is folded or rolled and fastened via a fastening mechanism.

The central vest may be made of a compression material as described earlier with reference to the first embodiment of FIGS. 1-6. Alternatively, the central vest may be made of nylon or other non-compressive materials. In one example, the compression sleeve 1404 is made of a material 1426 (dotted pattern) having high compression while the vest is made of a material 1427 (wavy pattern) having lower compression (such as no compression).

When made of compression material, the material may be of variable compression, including distinct compression zones of varying pressure (such as any combination of zones of light, medium, and high compression). Alternatively, the central vest may be made of a material of uniform compression (which may be light, medium, or high compression throughout).

The compression sleeve 1404 is attached at 1424 to the central vest 1402. That is, the compression sleeve 1404 is attached to the underside of the posterior end of the central vest 1402. In some aspects, the compression sleeve 1404 may be attached so as to form a pouch or pocket 1420 into which hot or cold packs or other therapeutic agents may be placed. Each end 1418 of the compression sleeve is positioned on either side of a longitudinal axis of the vest, and the quadruped 1511. The ends 1418 of the compression sleeve may be tapered and contoured such that they fit the hock and ankle region of the quadruped. In alternate examples, the ends of the compression sleeve may have a fastening element 1419, such as buttons, hook-and-loop fasteners, etc., via which the end may be fastened with a desired degree of tightness around the quadruped's ankle. As in FIG. 10, an opening (not shown in FIG. 14) such as 722 in the compression sleeve allows a hind leg of the quadruped, which is to be compressed, to be inserted into the corresponding opening 1422 of the compression sleeve. The fit of the compression sleeve may be adjusted through the use of an opening comparable to opening 721 in FIG. 7 which allows for one end of the compression sleeve to be inserted to wrap the compression sleeve around the hind quarters of the quadruped, adjusting the fit to the girth of the animal. In some aspects, the wrapped compression sleeve may be angled or cantilevered as shown in FIGS. 15 and 16, removing stress from the lumbar spine and in some aspects compressing the hips of the quadruped to provide additional support. In other aspects, the length of the vest may be adjusted to fit the body of an animal as shown by the pleats 1448 and described in further detail with reference to FIGS. 17-21.

Figure 18:
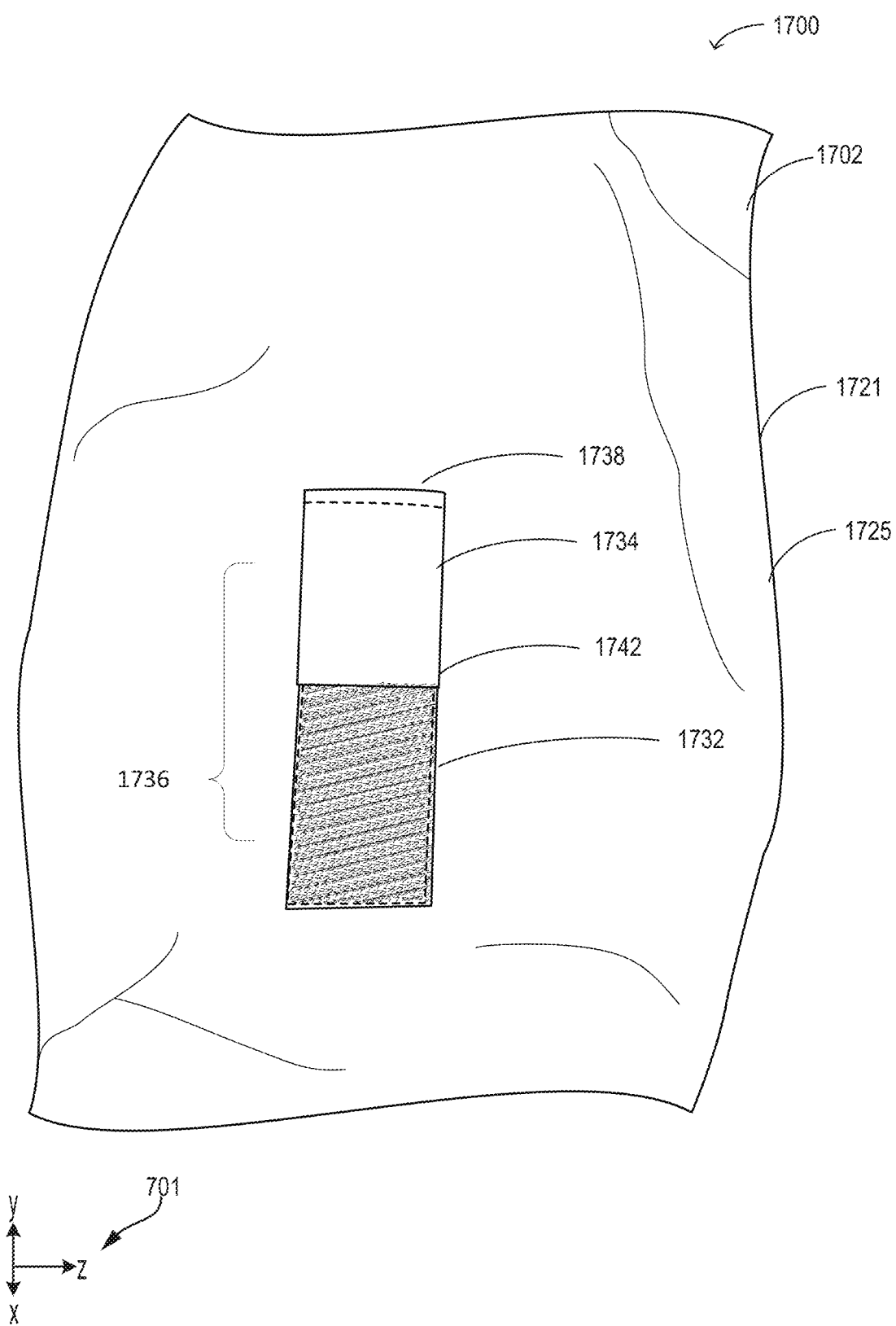
FIG. 18 illustrates an adjustment mechanism of a middle portion of the central vest taken along the cutting line A of FIG. 17 in a first configuration.
Figure 19:
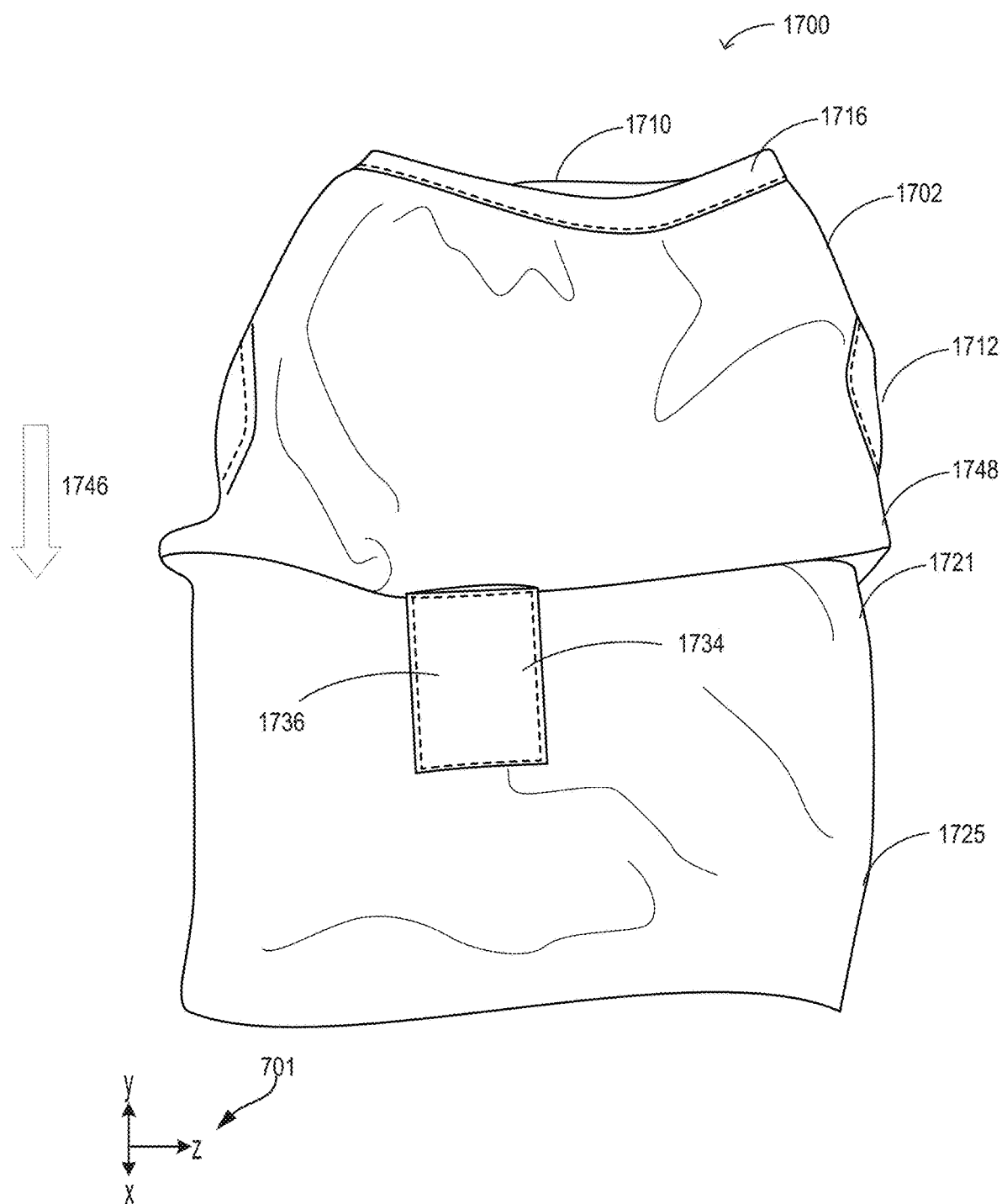
FIG. 19 illustrates an adjustment mechanism of a middle portion of the central vest taken along the cutting line A of FIG. 17 in a second configuration.

FIGS. 17-21 show an example embodiment 1700 of the central vest of a compression garment for a quadruped. FIG. 17 shows the vest by itself, laid out. FIG. 18 shows the middle portion of the central vest taken along the cutting lines A of FIG. 17 in a fully extended position. FIG. 19 shows the middle portion of the central vest taken along the cutting lines A in FIG. 17 in a shortened position. FIGS. 20-21 respectively show side and top views of an assembled garment 2000 worn by a quadruped including a central vest as shown in FIG. 17 and a compression sleeve. In the depicted example, the quadruped is a canine though the garment could be worn by any four-legged animal. The description below refers to any or all of FIGS. 17-21.

FIG. 17 shows an example embodiment 1700 of an adjustable central vest 1702 which may be used alone or in combination with a compression sleeve as shown in FIGS. 10 and 14-16.

The central vest 1702 is configured substantially cylindrically with a primary anterior opening 1710 through which an anterior region of the quadruped (including head) is exposed when the vest is worn, and a primary posterior opening 1714 though which a posterior region 1717 of the quadruped (including loin, and tail) is exposed. In some aspects, the vest may be made of material that is relatively inelastic. By "relatively inelastic" it is meant that the fabric does not noticeably stretch when subjected to the stresses and strains associated with its use. In other aspects, the central vest 1702 may be compressive or non-compressive. For example, in some aspects, it may be made of a compression material similar to that of compression material 706, and/or as described earlier with reference to FIGS. 1-6.

A pair of smaller anterior openings 1712 are provided in the vest for receiving the anterior legs. The pair of smaller anterior openings are symmetrically positioned along a central longitudinal axis of the vest, and closer to the primary anterior opening 1710 than the primary posterior opening 1714. Similarly, the vest may additionally have a pair of smaller posterior dorsal openings 1715 for receiving the compression sleeve 1704 for the posterior legs. The smaller posterior pair of dorsal openings are symmetrically positioned along a central longitudinal axis of the vest, and closer to the primary posterior opening 1714 than the primary anterior opening 1710.

Each opening may be lined via a cuff 1716 to provide comfort when the vest is worn, and to reduce the likelihood of allergic reactions. The cuff 1716 may be made of the same or a different material than both the central vest and the compression sleeve. In some aspects the cuff is an extension of the compression sleeve 1704.

A middle portion 1721 of the central vest 1702 is adjustable along a longitudinal axis via an adjustable dorsal fastening element 1736 (first attachment point) on the upper side 1725 of the central vest 1702 along the spine of the animal. The dorsal fastening element 1736 may be located between the smaller anterior and posterior openings of the vest. This fastening element 1736 allows the central vest to be fitted to the length of the quadruped's central body form, allowing for a single size vest to fit multiple sizes of quadrupeds.

The adjustable dorsal fastening element 1736 may be configured with a two part fastening element as shown in FIG. 17, such as hook and loop (for example, Velcro®) which may be used to adjust the horizontal length of the vest along the longitudinal axis of the animal to fit the body of the animal. The fastening element 1736 may be any fastening element generally used, for example Velcro®, hook and eye, snaps, laces, buttons or buckle fastening, or a combination thereof. In some aspects the fastening element has a first portion 1732 attached at a first location along the longitudinal axis of the vest and a mating portion 1734 attached at a second location along the longitudinal axis of the vest. In some aspects, the first and second location are the same, that is, a first end of the first portion 1732 and a first end of the mating portion 1734 are attached at the same point on the vest. In other aspects, the first and second locations are different. For example, in some aspects, a first end 1738 of the mating portion 1734 may be attached to the compression vest at a first end 1740 of the first portion 1732 with the second end 1742 of the mating portion freely available as shown in FIG. 17. The mating portion of the fastening element may be the same or a different length than the first length. In some aspects, the length of the first portion 1732 is longer than the mating portion 1734.

When the mating portion 1734 of the fastening element is in an open position, the vest is in a fully extended configuration with the second end 1742 of the mating portion of the fastening element freely available or attached such that no tension is applied to the length of the vest as shown in FIG. 18. In a second configuration, the second end 1742 of the mating portion 1734 of the fastening element 1736 may be releasably attached to the first portion 1732 at one or more locations, allowing for the longitudinal extension of the vest at a middle portion 1721 to be decreased by one or more amounts as shown by the arrow 1746. In other aspects, such as with a buckle, the first portion may be a buckle positioned such that the second end of the mating portion may be threaded through the buckle to adjust the length of the vest. Similar adjustable fastening arrangements may be made using alternative fastening elements. In some aspects, the excess material of the middle portion 1721 of the vest may be gathered as shown at 1748. Such a gathering may be a fold, roll, pleat, or any other mechanism that allows for the gathering of excess material. Either the folding or the pleating of a central portion of the vest decreases the longitudinal length of the vest.

The central vest 1702 includes two dorsal slits or openings 1715 through which the compression sleeve 1704 is threaded. Upon threading, each end 1718 of the compression sleeve is positioned on either side of a longitudinal axis of the vest 1702, and the quadruped 801. The ends 1718 may be tapered and contoured such that they fit the hock and ankle region of the quadruped. In alternate examples, the ends may have a fastening element 1719, such as buttons, hook-and-loop fasteners, etc., via which the end may be fastened with a desired degree of tightness around the quadruped's ankle. Opening 722 (not shown in FIG. 21) in the compression sleeve allows a hind leg of the quadruped, which is to be compressed, to be inserted into the corresponding end of the compression sleeve 1704. When coupled, the compression sleeve 1704 provides circumferential or annular compression on hind legs of a quadruped, while the vest redistributes the weight from the hind legs to a thoracic region (or torso) of the quadruped's body, thereby relieving weight and stress from the spinal region. In particular, the compression sleeve covers and applies compression to the hock 114 and rear metatarsal region 112. The fit of the compression sleeve may be adjusted through the use of opening 723 (as shown in FIG. 7) which allows for one end 1718 to be inserted to wrap the compression sleeve around the hind quarters of the quadruped, adjusting the fit to the girth of the animal.

In some aspects, the vest may include a pouch or pocket 1720 similar to pocket 1420 and located between the compression sleeve and the central vest into which hot or cold packs or other therapeutic agents may be placed. In some examples, the pocket may be sealed on three sides, leaving a single opening though which the heat and cold packs may be inserted. In other embodiments, the pocket or pouch may be open on opposite ends. The pocket or pouch may also be closable, that is it may be sealed on three sides and the open side may include a fastener or flap to close the opening. In other aspects, the pocket or pouch may be detachable, allowing for hot and cold packs to be applied where needed. Such a pocket or pouch may attach to the central vest in any way generally used, for example via hook and loop fastenings, hook and eye fastenings, buttons, snaps, ties, buckles or other fastenings generally known to those of ordinary skill in the art.

As shown in the top view in FIG. 20 and the side view in FIG. 21, the central vest 1702 has been coupled to a compression sleeve 1704. The length of the middle portion 1721 of the central vest 1702 has been shortened via fastening mechanism 1736. In this configuration, only the mating portion 1734 of the fastening mechanism is visible. The anterior end of the canine fits through the primary anterior opening 1710 and the anterior (fore) legs fit through the smaller anterior openings 1712 lined by cuffs 1716. The compression sleeve 1704 forms a pocket or has a pocket attachment 1720 between the compression sleeve and the central vest 1702. The ends 1718 of the compression sleeve may be tapered and fastened at 1719 via a snap or other fastening mechanism for a better fit, allowing appropriate support to be provided to the quadruped.

The disclosure also provides support for a compression garment for a quadruped such as a dog or horse, including a first moderate compression zone adapted for applying substantially circumferential compression to a hind metatarsus of the quadruped, the first moderate compression zone comprising elastic yarns integrated with a body yarn, a first light compression zone adapted for applying substantially circumferential compression from the hind metatarsus to a stifle joint, a first high compression zone adapted for applying compression at the back of the stifle joint and a second light compression zone over a patella, a fourth moderate compression zone adapted for applying substantially circumferential compression at a knee, a fourth light compression zone adapted for applying substantially circumferential compression above the knee and adjacent to the fourth medium compression zone, and wherein the first moderate compression zone, first light compression zone, first high compression zone, second light compression zone, fourth moderate compression zone, and fourth light compression zone are formed in adjacent sections of a continuous compression material. In a first example of the compression garment, the first light compression zone applies an amount of compression between 10 to 15 mmHg. In a second example of the compression garment, optionally including the first example of the compression garment, the first high compression zone applies an amount of compression greater than 20 mmHg. In third example of the compression garment, optionally including one or more or each of the first and second examples of the compression garment, the moderate compression zone applies between 10% to 50% less compression to the hind metatarsus as compared to the compression applied by the first high compression zone. In a fourth example of the compression garment, optionally including one or more or each of the first third examples of the compression garment, the first and second moderate compression zones apply substantially equal compression to a hind leg of the quadruped. In a fifth example of the compression garment, optionally including one or more or each of the first through fourth examples of the compression garment, the compression on the hind metatarsus and a fourth moderate compression zone at the top of an anterior leg apply substantially a same amount of compression. In a sixth example of the compression garment, optionally including one or more or each of the first fifth examples of the compression garment, the compression in the moderate compression is a moderate level of compression, wherein the moderate level of compression is between 10% to 50% less compression as compared to the compression applied by the high compression zones.

The disclosure also provides support for a therapeutic method for compensating for spinal strength insufficiency in a quadruped comprising: applying a compression garment to the quadruped and wearing the compression garment to support a hind legs of the quadruped, such that a first moderate compression zone applies between 15 to 20 mmHg of substantially circumferential compression to a hind metatarsus of the quadruped, a first light compression zone applies between 10 to 15 mmHg of substantially circumferential compression from the hind metatarsus to a stifle, a fourth moderate compression zone applies 15 to 20 mmHg of substantially circumferential compression to an area at a knee, a body wrap comprising areas of light, moderate and high compression, and a third moderate compression zone adapted for applying substantially circumferential compression above a second high compression zone at the top of the femur such that the compression garment provides support sufficient to compensate for the spinal strength insufficiency. In a first example of the method, the quadruped is a canine. In a second example of the method, the quadruped is an equine.

The disclosure also provides support for a second compression garment for a quadruped, comprising: a tubular compression sleeve for applying radial compression on a pair of limbs of the quadruped, the sleeve having a first opening through which one of the pair of limbs is received when clothing the sleeve on the quadruped, the first opening separated from a second opening by a length of the compression sleeve, the length wrapped around a body of the quadruped before the other of the pair of limbs is received at the second opening. In some aspects the tubular compression sleeve may provide uniform compression. In other aspects, the tubular compression sleeve may provide variable compression such as the variable compression provided in the first through sixth examples of a compression garment.

In a second example of the second compression garment, optionally including the first example of the second compression garment, the garment further comprises: a vest that is adapted to be wrapped around a torso of the quadruped, the vest having a pair of openings through which the compression sleeve is threaded. In one example, the vest may have anterior openings for receiving the forelegs of the animal and posterior openings for receiving the compression sleeve, the compression sleeve having a pair of terminal openings for receiving the hind legs. In other aspects, the vest may have a pair of anterior openings for receiving the forelegs of the animal without posterior openings as the compression sleeve is positioned and attached via alternative mechanisms. The compression sleeve may apply annular compression on the hind legs. The compression material of the vest may be the same or different from the compression material of the sleeve. In a third example of the second compression garment, optionally including one or more or each of the first through second examples of the second compression garment, a compression material of one or more of the vest and the sleeve provides independently distributed compression to the limbs and torso of the quadruped in a continuous or non-continuous manner. In a fourth embodiment of the second compression garment, optionally including one or more of each of the first through third examples of the second compression garment, the compression vest includes at least one attachment point including a fastening mechanism along a longitudinal axis of the compression vest. In a fifth embodiment of the second compression garment, optionally including one or more of each of the first through fourth examples of the second compression garment, the at least one attachment point including a fastening mechanism may be centrally located on the vest between the anterior openings and the posterior dorsal openings of the compression vest. The at fastening mechanism may include a first portion and a mating portion wherein the first half of the fastening mechanism is longer than a mating portion of the fastening mechanism, the mating portion configured to attach to the first half of the fastening mechanism at a plurality of locations. In a sixth embodiment of the second compression garment, optionally including one or more of each of the first through fifth examples of the second compression garment, the first portion of the fastening element and the mating portion of the fastening element may be connected in such a way as to shorten the length along a longitudinal axis of the compression garment. In a seventh embodiment of the second compression garment, optionally including one or more of each of the first through sixth examples of the second compression garment, the compression sleeve may be attached to an exterior of the compression vest at a second attachment point. In an eighth embodiment of the second compression garment, optionally including one or more of each of the first through seventh examples of the second compression garment, the compression sleeve may be attached to an exterior of the compression vest at a second attachment point between the posterior dorsal openings of the compression vest. In a ninth embodiment of the second compression garment, optionally including one or more of each of the first through seventh examples of the second compression garment, the compression sleeve is attached to an undersurface of the compression vest. In a tenth embodiment of the second compression garment, optionally including one or more of each of the first through ninth examples of the second compression garment, the compression vest includes a pocket.

The foregoing description of the exemplary embodiments has been presented only for the purposes of illustration and description and is not intended to be exhaustive or to limit the invention to the precise forms disclosed. Many modifications and variations are possible in light of the above teaching. The embodiments were chosen and described in order to explain the principles of the invention and their practical application so as to enable others skilled in the art to utilize the invention and various embodiments and with various modifications as are suited to the particular use contemplated. Alternately embodiments will become apparent to those skilled in the art to which the present invention pertains without departing from its spirit and scope. Accordingly, the scope of the present invention is defined by the appended claims rather than the foregoing description and the exemplary embodiments described therein.

With the foregoing in mind, the following claims are intended to define the scope of protection to be afforded the inventor, and the claims shall be deemed to include equivalent constructions insofar as they do not depart from the spirit and scope of the present invention. A plurality of the following claims express certain elements as a means for performing a specific function, at times without the recital of structure or material. As the law demands, these claims shall be construed to cover not only the corresponding structure and material expressly described in the specification but also equivalents thereof.

The invention claimed is:

1. A flexible compression garment for a quadruped, comprising:
   a compression vest adapted to be wrapped around a torso of the quadruped, the compression vest comprising anterior openings for receiving fore legs of the quadruped and posterior dorsal openings for receiving a flexible fabric compression sleeve; and
   the flexible fabric compression sleeve having a pair of terminal openings for receiving hind legs of the quadruped, the compression sleeve applying annular compression on the hind legs;
   wherein the compression vest comprises at least one attachment point for a fastening mechanism along a longitudinal axis of the compression vest.

2. The flexible compression garment of claim 1, wherein the compression vest and the compression sleeve are made of different materials.

3. The flexible compression garment of claim 1, wherein a compression material of one or more of the compression vest and the compression sleeve provides uniform or variable compression to limbs and the torso of the quadruped.

4. The flexible compression garment of claim 1, wherein a compression material of one or more of the compression vest and the compression sleeve provides independently distributed compression to limbs and the torso of the quadruped in a continuous or non-continuous manner.

5. The flexible compression garment of claim 1, wherein the at least one attachment point comprises a first attachment point, wherein the first attachment point is located between the anterior openings and posterior dorsal openings of the compression vest along the longitudinal axis of the compression vest.

6. The flexible compression garment of claim 5, wherein a first portion of the fastening mechanism comprises a hook portion or a loop portion.

7. The flexible compression garment of claim 6, wherein the compression vest comprises a mating portion to the fastening mechanism.

8. The flexible compression garment of claim 7, wherein the first portion of the fastening mechanism has a length that is longer than the mating portion.

9. The flexible compression garment of claim 8, wherein the mating portion is configured to fasten to the first portion of the fastening mechanism at a plurality of locations along the length of the fastening mechanism.

10. The flexible compression garment of claim 9, wherein engaging the mating portion at a first location of the plurality of locations decreases the length of the compression vest.

11. The flexible compression garment of claim 1, wherein the compression sleeve is attached to an exterior of the compression vest at a second attachment point.

12. The flexible compression garment of claim 11, wherein the second attachment point is between the posterior dorsal openings of the compression vest.

13. The flexible compression garment of claim 12, wherein the second attachment point is a hook portion or a loop portion.

14. The flexible compression garment of claim 11, further comprising a detachable pouch.

15. The flexible compression garment of claim 1, wherein the compression sleeve is a single tube of material.

16. The flexible compression garment of claim 1, wherein the compression garment evenly distributes a weight of hindquarters across the body of the quadruped.

* * * * *